(12) United States Patent
Ehrhart et al.

(10) Patent No.: US 6,186,404 B1
(45) Date of Patent: Feb. 13, 2001

(54) SECURITY DOCUMENT VOIDING SYSTEM

(75) Inventors: Michael A. Ehrhart, Liverpool; Robert M. Hussey; Todd A. Dueker, both of Camillus, all of NY (US); Cayetano Sanchez, III, East Greenwich, RI (US); Walter Szrek, East Greenwich, RI (US); John C. Abraitis, Cumberland, RI (US); Claude Lambert, Montreal (CA); Francois Gougeon, Montreal (CA); Robert Boulay, Laval (CA); Denis Mondou, Chateaugay (CA)

(73) Assignee: Welch Allyn Data Collection, Inc., Skaneateles Falls, NY (US)

( * ) Notice: Under 35 U.S.C. 154(b), the term of this patent shall be extended for 0 days.

(21) Appl. No.: 09/088,936

(22) Filed: Jun. 2, 1998

Related U.S. Application Data

(63) Continuation of application No. 09/087,337, filed on May 29, 1998.

(51) Int. Cl.$^7$ ................................................. G06K 19/06
(52) U.S. Cl. ................................. 235/493; 283/85
(58) Field of Search .................................. 235/380, 488, 235/492, 441, 375; 289/85

(56) References Cited

U.S. PATENT DOCUMENTS

| | | |
|---|---|---|
| 4,376,887 | 3/1983 | Greenaway et al. . |
| 4,663,518 | 5/1987 | Borror et al. . |
| 4,812,171 * | 3/1989 | Brettle ..................................... 106/21 |
| 5,109,153 * | 4/1992 | Johnsen et al. ........................ 235/468 |
| 5,119,190 | 6/1992 | Lemelson . |
| 5,151,595 | 9/1992 | Filo . |
| 5,245,418 | 9/1993 | Gilmour et al. . |
| 5,302,825 | 4/1994 | Abumehdi et al. . |
| 5,311,017 | 5/1994 | Filo . |
| 5,334,836 | 8/1994 | Filo . |
| 5,369,273 | 11/1994 | Fisun et al. . |
| 5,414,262 | 5/1995 | Filo . |
| 5,421,869 | 6/1995 | Gundjian et al. . |
| 5,430,277 | 7/1995 | Ohno et al. . |
| 5,532,789 | 7/1996 | Yaginuma et al. . |
| 5,592,561 | 1/1997 | Moore . |
| 5,599,578 | 2/1997 | Butland . |
| 5,621,200 * | 4/1997 | Irwin, Jr. et al. ...................... 235/375 |
| 5,627,356 | 5/1997 | Takemoto et al. . |
| 5,633,949 | 5/1997 | Graves et al. . |
| 5,887,906 * | 3/1999 | Sultan ..................................... 283/94 |

FOREIGN PATENT DOCUMENTS

| | | |
|---|---|---|
| 08272970 | 10/1996 | (JP) . |
| WO 92/22083 | 12/1992 | (WO) . |
| WO 96/01454 | 1/1996 | (WO) . |
| WO 97/14482 | 4/1997 | (WO) . |

\* cited by examiner

*Primary Examiner*—Thien M. Le
(74) *Attorney, Agent, or Firm*—Wall Marjama & Bilinski

(57) ABSTRACT

The present invention is a system for voiding a security document. The system voids a security document by supplying heat to a localized area of a specially configured security document. According to the invention, conductive material is formed on a document so that at least one relatively higher resistance section is formed on the document. When a voltage is supplied to the document, a relatively high amount of heat is supplied to the document about the area of the relatively higher resistance section. Heat-sensitive material may be formed about the location of the relatively higher resistance section such that the heat sensitive material becomes visible or changes color when a voltage is supplied to the document.

16 Claims, 32 Drawing Sheets

| TICKET ID | GAME DATA ||||||
|---|---|---|---|---|---|---|
| | 1ST PLAY AREA ||| 2ND PLAY AREA ||| |
| | SIZE | CENTER | DIMENSION | CENTER | DIMENSION | 1ST SUBROUTINE | 2ND SUBROUTINE |
| XXYA | 2.0 X 4.0 | 0.7, 0.7 | 0.4 X 0.4 | 1.6, 3.0 | 0.4 X 0.4 | ON | OFF |
| XXZA | 4.0 X 5.0 | (-1.0), 2.0 | 1.0 X 1.0 | -- | -- | ON | ON |
| XXZB | 4.0 X 5.0 | (-1.0), 2.0 | 1.0 X 1.0 | -- | -- | ON | ON |
| XXAB | 3.0 X 4.0 | 1.5, (-2.0) | 1.0 X 1.0 | 3.5, (-2.0) | 1.0 X 1.0 | OFF | ON |

FIG. 5-5

SECURITY DOCUMENT VOIDING SYSTEM

This is a Continuation Application of U.S. application Ser. No. 09/087,337 filed May 29, 1998, the entirety of which is incorporated herein by reference.

BACKGROUND OF THE INVENTION

1. Field of the Invention

The present invention relates in general to a system for voiding security documents and particularly to a system for voiding a lottery game ticket.

2. Background of the Prior Art

"Scratch-off" lottery games continue to grow in popularity. These games have become an important source of revenue for national, state, and local governments throughout the world.

While there are hundreds of different styles of these games, there are characteristics common to the majority of scratch-off lottery game tickets manufactured. The majority of scratch-off lottery game tickets manufactured have topside and bottomside surfaces, an identification code bar code symbol formed on one of the surfaces, at least one "play area" formed on one of the surfaces, and scratch-off material formed over the play area. In playing a game, a user scratches off at least some of the scratch-off material to reveal indicia icons of the play area. In most scratch-off lottery games, the ticket is previously designated as a winner or nonwinner independent of where scratch-off material is removed. These games are known as "instant" ticket lottery games. In more sophisticated scratch-off lottery games known as "probability" games, the win/loss status of a game is dependent at least in part on the areas of a ticket where scratch-off material is removed.

As popular as scratch-off lottery game tickets have become, their popularity has been limited by two major problems. The first major problem is that present methods for processing such tickets after play are inefficient. The second major problem is fraud.

According to one popular method for processing a scratch-off lottery game ticket, the game ticket is validated (verified as a winning ticket) by reading the identification code bar code symbol on the ticket with use of a hand-held bar code reader to determine the identification code of a ticket, then the identification code is manually punched into a computer, which processes the identification code to determine if the ticket is a winner. This process is subject to failure by key entry error, and in addition is time consuming. Speed is an important factor in the processing of game tickets considering that game tickets are processed in convenience stores or grocery stores whose successful business depends to a large extent on the speed with which customers can be successfully serviced.

With regard to the problem of fraud, fraudulent schemes involving lottery game tickets are oftentimes carried out by persons authorized to handle the tickets prior to their official sale. Such persons may be for example, employees of a game ticket manufacturer, employees of a ticket distributor, convenience or grocery store sales clerks, or store owners. These persons are herein referred to as "agents" of lottery game ticket sales or ticket agents. Ticket agents have been observed to employ various "peeking" techniques to determine the form of indicia icons of a play area and therefore the win/loss status of game tickets prior to their sale in order to separate winning tickets from losing tickets before playing known winning tickets or selectively selling known winning tickets to themselves or to an accomplice. In probability games, the peeking schemes can be carried out by game players to determine which sections of scratch-off material need to be removed in order to make a game ticket a winning ticket.

Several types of "peeking" fraudulent schemes involve "tampering" of game tickets. In a tampering scheme, a ticket agent or probability game player determines the win/loss status of a ticket by removing at least a portion of scratch-off material from a game ticket to determine the form of indicia icons of a play area.

In other peeking schemes, a ticket agent or probability game player attempts to determine the win/loss status of a game ticket without tampering with or materially altering the game ticket.

Existing manufacturing techniques for making lottery tickets, and techniques for processing them cannot adequately prevent peeking fraud schemes such as those described from being successfully carried out. Fortunately, to some extent peeking schemes carried out by ticket agents can be checked by controlling the packaging and distribution of such tickets and by tracking winning tickets. Therefore, "instant" lottery games (wherein the win/loss status of a ticket is determined at the time the ticket is manufactured) remain viable in spite of the persistence of peeking schemes.

Probability type lottery games (wherein the win/loss status of a ticket depends in part on the areas of the scratch-off material which are removed) will not become viable, however, until substantially all of the possible peeking schemes can either be adequately prevented or adequately detected. Making viable probability type scratch-off lottery games would be expected to enhance the enjoyment derived from the playing of scratch-off lottery games, and therefore the popularity and revenue generating capacity of such games.

In addition to peeking schemes, scratch-off lottery ticket gaming industry is threatened by the problem of counterfeiting of game tickets by ticket agents and game players. In a common counterfeiting scheme involving instant game tickets, parts of winning tickets are fraudulently combined with parts of losing tickets to construct counterfeit winning tickets. According to one popular scheme, the identification code bar code symbol (or copy thereof) from a winning ticket is attached to a losing ticket. In a probability game, indicia icons can be transported from one ticket to another to create the appearance of a winning ticket having the appropriate combination of icons indicating a winning ticket.

There is a need for an apparatus for processing lottery game tickets more quickly than is possible with current methods. There is also a need for improved game ticket structures, processing methods and apparatuses for preventing or detecting the peeking into the form of indicia icons of a game ticket, and for preventing or detecting the construction of counterfeit game tickets.

BRIEF DESCRIPTION OF THE DRAWINGS

FIGS. 2-1 to 2-4 illustrate examples of lottery game tickets.

FIG. 2-5 is an exploded cross-sectional side view of a prior art scratch-off lottery game ticket.

FIG. 2-6 is a top view of a lottery game ticket including play areas having scratch-off material formed thereon according to a predetermined pattern;

FIG. 2-7 is an exploded top view of a play area of a game ticket having scratch-off material formed according to a predetermined pattern;

FIGS. 2-8 and 2-9 are exploded cross-sectional views of game tickets manufactured according to an improved design;

FIG. 2-10 is a top view of another lottery ticket;

FIG. 3-1 shows a functional schematic diagram of a first material detection system according to the invention;

FIG. 3-2 shows a lottery game ticket having a section of scratch-off material removed;

FIG. 3-3 shows a video image of the ticket of FIG. 3-3 produced by the imaging system described with reference to FIG. 3-1;

FIG. 3-4 shows a functional schematic diagram of another detection system of the invention;

FIG. 3-5 is a perspective view of a game ticket having scratch-off material;

FIG. 3-6 shows a functional schematic diagram of yet another detection system of the invention;

FIG. 3-7 is an exploded cross-sectional side view of a game ticket;

FIG. 3-8 illustrates a game ticket when viewed under white light and red light;

FIG. 3-9 illustrates a game ticket when viewed under white light, red light and green light;

FIGS. 3-10 and 3-11 are video images that have been subjected to a tampering scheme.

FIG. 4-1 shows a functional diagram of a document processing apparatus having a non-contact branding system incorporated therein;

FIG. 4-2 shows a lottery game ticket according to the invention having brandable material formed thereon according to such a pattern that an identification code bar code symbol is obscured when the brandable ink is excited;

FIGS. 4-3 and 4-4 show security documents according to the invention having conductive ink formed thereon according to such a pattern that a localized area of the document is supplied with heat when voltage is applied across the document.

FIGS. 4-5 and 4-6 show, respectively top cross-sectional and front view functional schematic diagram of a document processing apparatus including a voltage source for branding a document configured according to the design described with reference to FIGS. 4-3 and 4-4;

FIG. 4-7 shows a lottery game ticket having brandable material formed thereon in a pattern differing from that shown in FIG. 4-2;

FIG. 5-1 is a cross-sectional side view functional schematic diagram of a document processing apparatus according to one embodiment of the invention;

FIG. 5-2 is an exemplary block electrical diagram of a document processing apparatus;

FIG. 5-3 is a block diagram illustrating a possible communication system including a document processing apparatus, a local host processor and a remote host processor;

FIG. 5-4 is a flow diagram illustrating operation of an exemplary main program for a document processing apparatus according to the invention;

FIG. 5-5 is an exemplary lookup table which may be incorporated into a document processing apparatus according to the invention;

FIG. 5-6 is a cross-sectional side view functional schematic diagram of a document processing apparatus according to another embodiment of the invention;

FIG. 5-7 is a cross-sectional side-view functional schematic diagram of a document processing apparatus according to yet another embodiment of the invention;

FIG. 6-1 is a flow diagram illustrating operation of an eximplary capture/decode/test routine according to the invention;

FIG. 6-2 is a flow diagram illustrating operation of an exemplary "test for scratch-off removal" subroutine according to the invention;

FIG. 6-3 is a flow diagram illustrating operation of an exemplary "tamper detection" subroutine according to the invention;

FIG. 6-4 is a flow diagram illustrating operation of an alternative "test for scratch-off material removal" subroutine according to the invention; and FIG. 6-5 is a flow diagram illustrating operation of an exemplary "Branding" subroutine according to the invention.

DETAILED DESCRIPTION OF THE PREFERRED EMBODIMENTS

I. Summary and Overview

Figure 1:
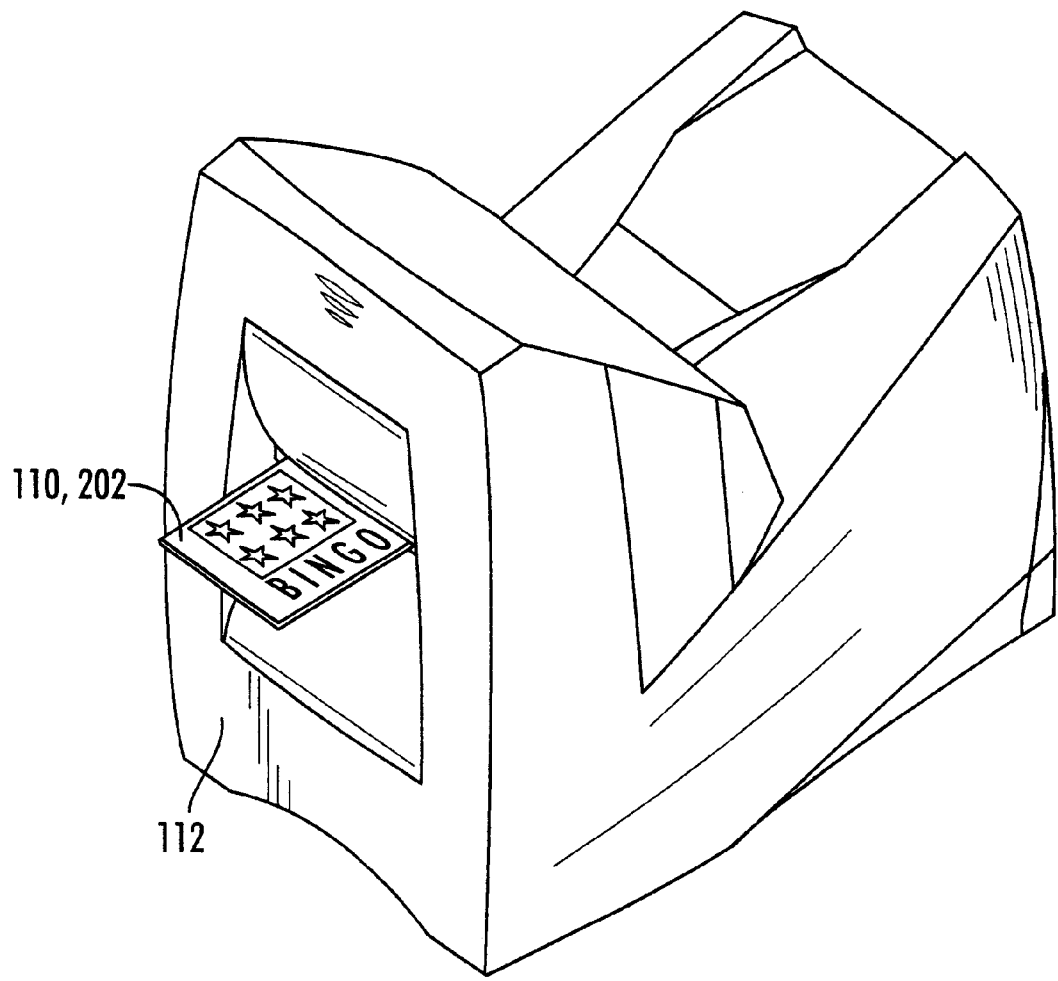
FIG. 1-1 shows a skin perspective diagram of an embodiment of a document reader according to the invention having a lottery game ticket inserted therein.

Referring to FIG. 1-1, the inventions described herein relate to security documents 110 and to apparatuses 112 and methods for processing the same. In particular, the invention relates to "scratch-off" lottery game tickets and to apparatuses for automatically reading and processing scratch-off lottery game tickets.

Some inventions described herein relate to improved designs for lottery game tickets. For example, in one invention described herein a game ticket is provided with a specialized layer which prevents peeking into the win/loss status of a game. In another invention, the ticket includes a specially adapted scratch-off material which renders easily detected the fraud of peeking into the win/loss status of a game by way of removing and replacing a section of scratch-off material.

Other inventions described herein relate to document security systems requiring specialized adaptations of both a game ticket 202 (FIGS. 2-1 to 2-10) and of an apparatus 112 for processing game tickets. For example, in one invention, game ticket 202 is provided with scratch-off material having a specialized additive incorporated therein, and apparatus 112 includes an imaging system which is specially adapted to detect for the presence of the additive incorporated in to the game ticket. In another document security system, ticket 202 is provided with a brandable material which is normally invisible but which becomes visible when exposed to heat, and conductive material formed over a surface of the ticket such that a relatively high resistance area of conductive material is formed over the area of the brandable material. An apparatus for processing such a game ticket includes a voltage source for supplying voltage to the ticket so that the high resistance section of the conductive material heats up to locally supply heat to the brandable ink.

Still other inventions described herein relate to improvements to document processing apparatuses. In one embodiment, a security document processing apparatus is described having three imaging assemblies all operated under the control of a processor-based controller. The first two imaging assemblies are dedicated, respectively, for generating image signals representing the topside and the bottomside of the ticket as seen in visible light while a third imaging assembly is dedicated for generating image signals indicative of the material composition of the game ticket. In other embodiments, a controller controlling a document processing apparatus is in communication with a memory space comprising a lookup table. The lookup table correlates the identification code for the present game ticket with flag status indicators for controlling the operations of a processing apparatus's main program and with physical characteristic game data. By providing a lookup table correlating identification codes with flag status indicators and physical characteristic game data, the operations performed by apparatus 112 and the particular methods for performing those operations are made dependent on the identification code of the game ticket being processed.

While the inventions described herein relate specifically to lottery game tickets, skilled artisans will appreciate that many of the structures, methods, systems, and apparatuses described herein are equally applicable to other types of security documents, such as checks and other negotiable instruments, paper currency, entertainment and sporting event tickets, test forms, and merchandise coupons.

II. Lottery Game Tickets

Figures 1, 2:
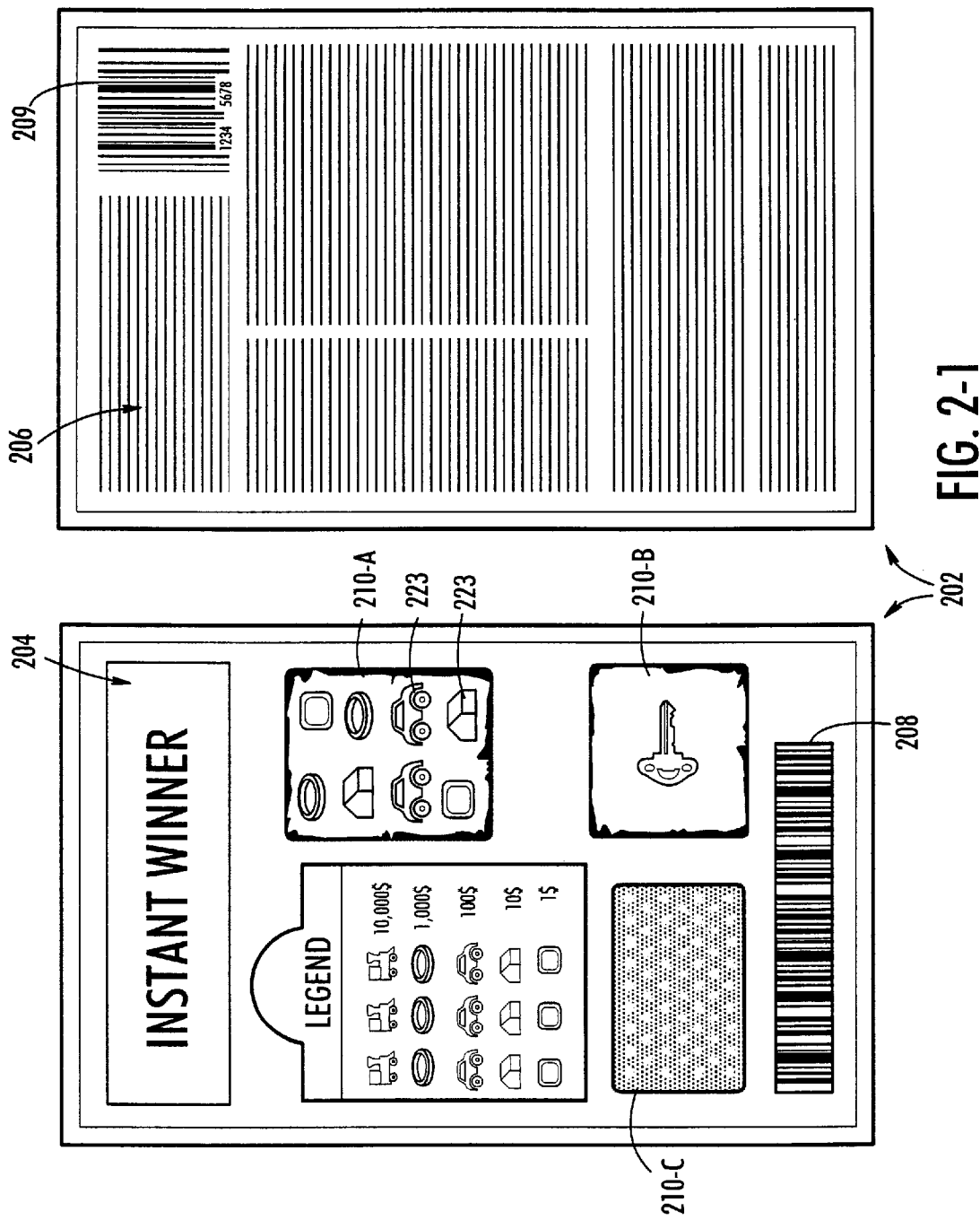
Figure 2:
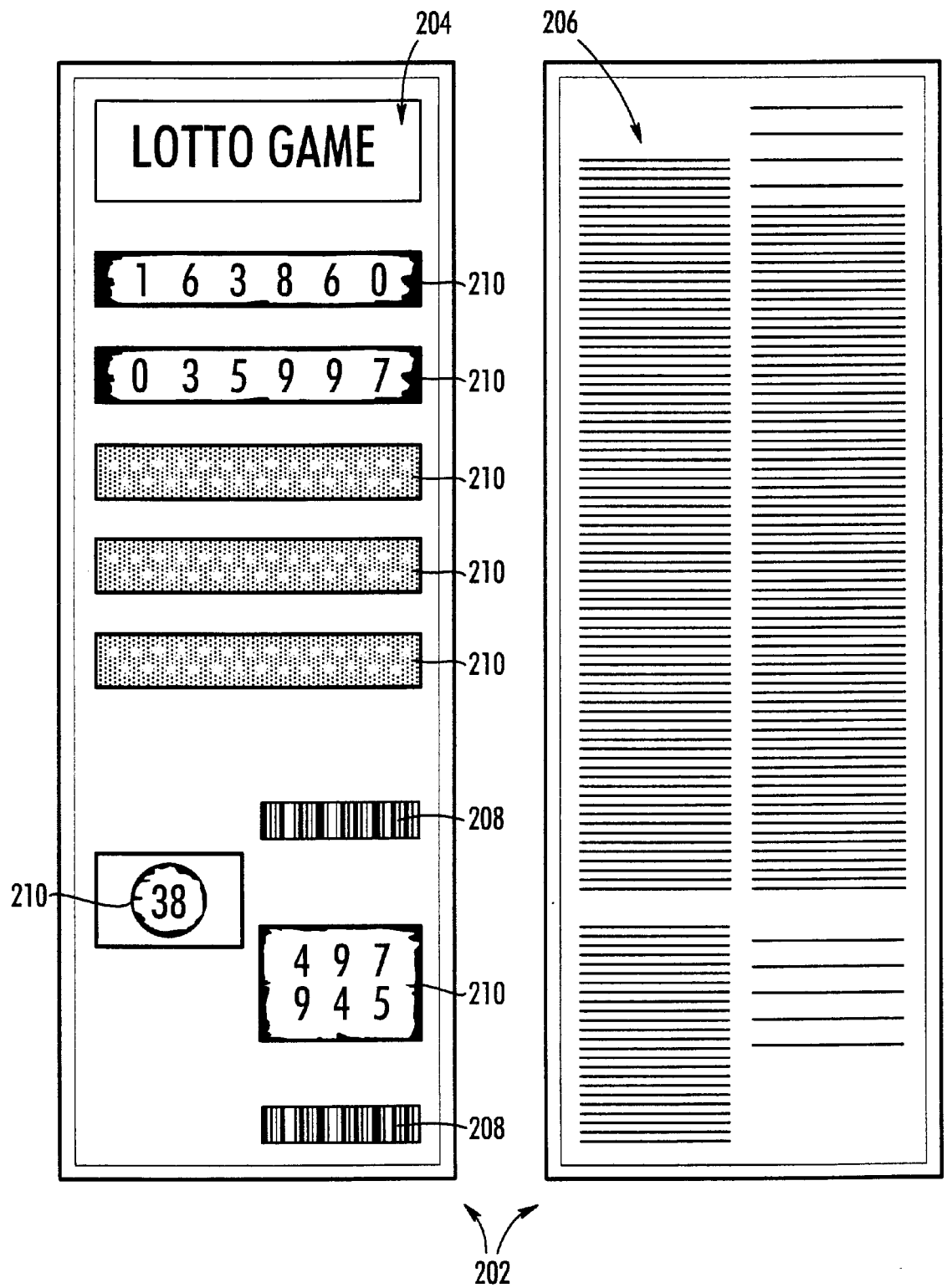
Figures 2, 3:
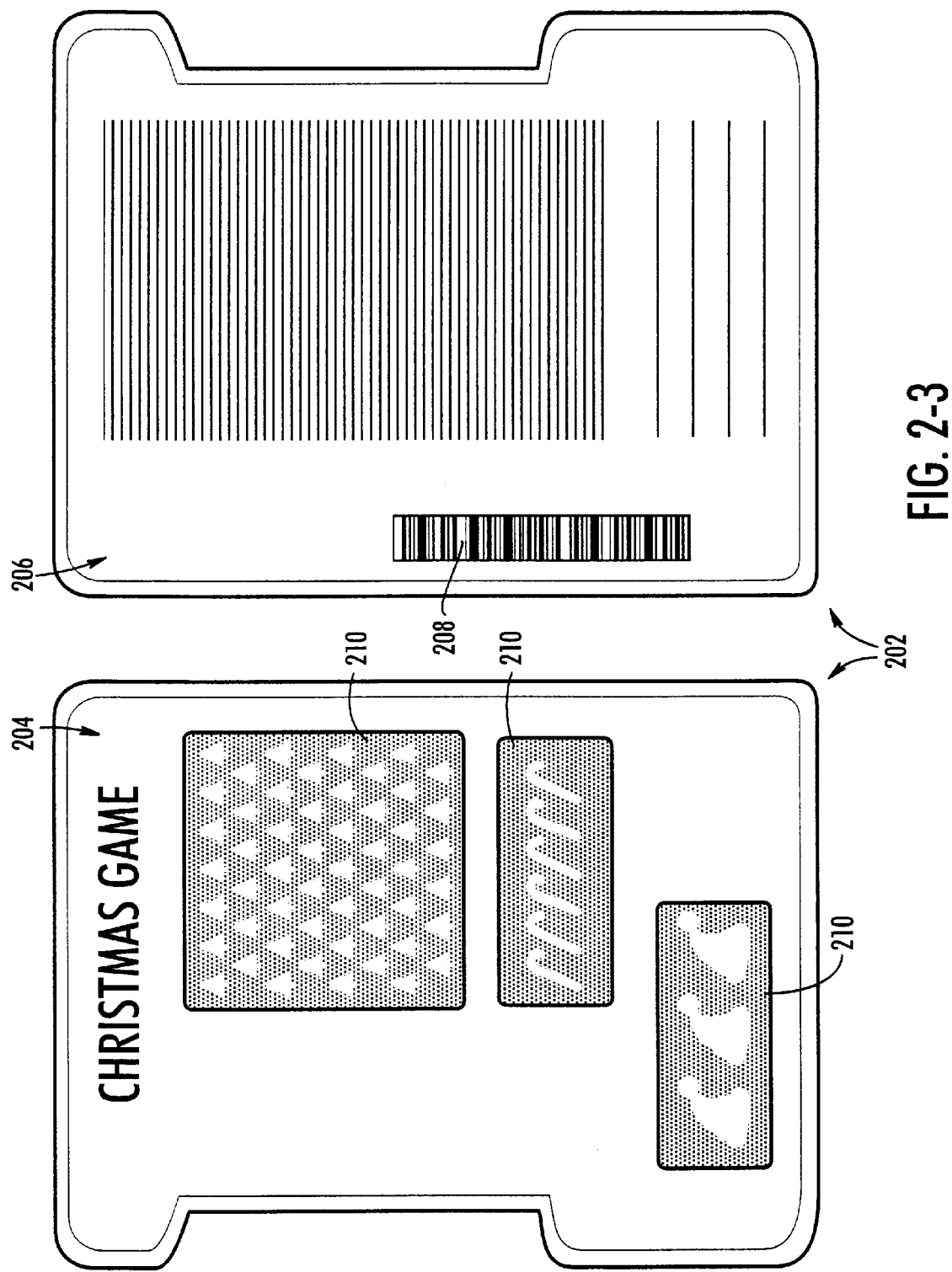
Figures 2, 3, 4:
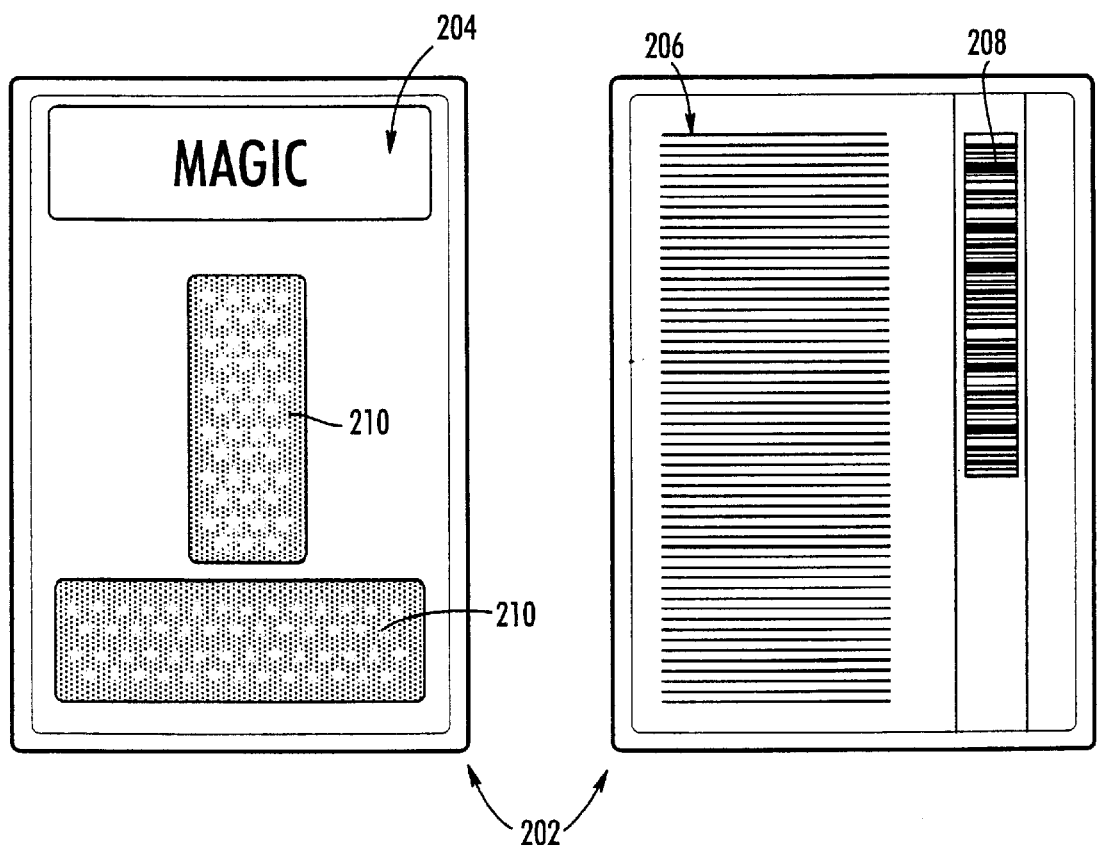

Lottery game tickets of the type which apparatus 112 is adapted to process are shown in FIGS. 2-1 through 2-4. Lottery game tickets are manufactured in a variety of different styles, each style corresponding to a different lottery game, e.g. "Instant Winner®" (FIG. 2-1), "Lotto Game" (FIG. 2-2), "Christmas Game" (FIG. 2-3), "MAGIC" (FIG. 2-4). There are literally hundreds of styles of instant lottery game tickets manufactured throughout the world. Each style of game ticket includes a unique indicia pattern printed thereon. Instant lottery game tickets are manufactured in many sizes, depending on the style of the ticket. Lottery game tickets range in size from about 1.5"×3" to about 5"×8".

In spite of the wide variety of indicia patterns, and sizes of instant lottery game tickets, there are numerous similarities between instant lottery game tickets of the various styles. All instant lottery tickets of the type described include topside 204 and bottomside 206 surfaces having indicia patterns formed on theses surfaces, and an identification code bar code symbol 208 formed on one of the surfaces. Furthermore, all instant lottery game tickets of the type described include at least one play area 210 formed on one of the surfaces. Instant lottery game tickets of the type described typically include at least one but normally more than one play area on the topside of the ticket. For example, ticket 202 of FIG. 2-1 includes three play areas 210-A, 210-B, and 210-C. The play area of each ticket is covered by scratch-off material when the ticket is manufactured. In playing a game, a player removes at least a portion of the scratch-off material to reveal indicia printed in the play area of the ticket which is covered by scratch-off material when the ticket is first manufactured. In one common style of game, this indicia comprises a plurality of icons 223 whose form may vary from ticket to ticket of a given style. These icons are referred to herein as variable data icons. The player of the ticket becomes aware that a ticket is a winner if a certain pattern of variable data icons are revealed when the scratch-off material is removed. For example, a player becomes aware that the ticket of the style shown in FIG. 2-1 is a winner if three identical indicia icons are included in play area 210-A.

Identification code bar code symbol 208 encodes data pertaining to a game ticket 202. When lottery game tickets of the type described first became available then symbol 208, encoded in a well known symbology, contained information which revealed whether the ticket was a winner or not. This left the tickets susceptible to a fraud in which a ticket agent read the bar code to determine the win/loss status of game tickets prior to sale. In the majority of lottery game tickets manufactured today, the identification code bar code symbol 208 encodes only a ticket identification code. In validating (determining the win/loss status) of tickets of this type, store clerks typically determine the identification code of a ticket using a prior art bar code reading device, then manually key in the identification number into a computer which is configured to validate the ticket by applying the identification code to a validating algorithm stored in a memory space of the computer. The features of the validating algorithm are kept secret and updated periodically so that the win/loss status of a game ticket cannot be determined by determining this identification code.

In most lottery game tickets of the type described having topside and bottomside surfaces 204, 206, identification bar code symbol 208, at least one play area 210 and scratch-off material formed thereon, the win/loss status of the ticket is predetermined at the time of ticket manufacture. Lottery games in which the win/loss status of the game is determined at the time of ticket manufacture are commonly referred to as "instant" lottery games and the tickets associated with these games are commonly referred to as "instant" lottery game tickets. The locations on an instant lottery game ticket where scratch-off material is removed is irrelevant to the win/loss status of the ticket. In a typical playing of this type of game the player merely scratches off substantially all available scratch-off material of the game ticket to determine whether the ticket is a winner.

However, in more sophisticated "scratch-off dependent" lottery ticket games, which are expected to become more popular as processing apparatuses such as the ones described herein become available, then the location(s) of scratch-off material removal determine, at least in part, whether the ticket is a winner. In scratch-off dependent games, then all or some tickets can be designated as "possible winners" at the time of ticket manufacture. Lottery games in which the win/loss status of a game is dependent at least in part on the location(s) of scratch-off material removal are commonly referred to as "probability-type" lottery games. An example of a probability game ticket is shown in FIG. 2-10. It should be understood that the game ticket 202 shown in FIG. 2-10 is for illustrative purposes only and other constructions are contemplated. Game ticket 202 in the example given includes one large play area 210 having scratch-off material applied thereto. In playing this type of game, a player removes only select portions of the available scratch-off material. Play area 210 includes a plurality of "cells" 213 which are delimited by sections 215 of scratch-off material that should not be removed during the playing of a game. A player wins a probability-type lottery game by removing scratch-off material from the appropriate cells. In an alternative design for a probability lottery game ticket, the ticket may include a plurality of play areas, each play area defining a single cell. These single cell play areas are commonly referred to as play cells. It will be recognized that unless all peeking schemes are either prevented or detected, there is a substantial risk of loss on every probability game ticket sold.

Referring now to structural aspects of lottery game tickets, an enlarged cross sectional diagram illustrating the material composition of a typical prior art lottery game ticket 202 is shown in FIG. 2-5. Game ticket 202 includes a substrate 218, and several layers of material layered over the substrate. Cross sectional diagram 219 shows a boundary 220 between a play area 210 of a game ticket and a non-play area 222 to illustrate that the play area 210 has a greater thickness than non-play area 222.

Formed directly on substrate 218 in play area 210 is a first ink layer 226 which forms the indicia which will be covered by scratch-off material. Indicia patterns of this layer comprise, typically, variable data indicia icons 223 as seen in game ticket play area 210-A of FIG. 2-1. First ink layer will be referred to herein as indicia icon layer 226.

Second layer 228, known as the release layer, comprises a translucent material such as printable varnish. The purpose of this layer is to protect indicia icons 223 of indicia icon layer 226 so that indicia icons are not removed when scratch-off layers of the game ticket are removed.

The layers of material over the release layer 228 comprise the scratch-off material 211 of a game ticket. Scratch-off material 211 in a typical game ticket comprises 7 layers. Three layers, layers 230, 231 and 232, comprise carbon black, while three layers 234, 235 and 236 comprise white ink. The function of the three carbon layers 230, 231 and 232 is to prevent light from passing through the game ticket. Without the three carbon layers, a ticket agent or a probability game player could fraudulently determine the form of the indicia icons 223 by backlighting ticket 202 with a high radiance light source and viewing the form of indicia icons through layers 234, 235, 236 and 238.

Three white ink layers 234, 235 and 236 provide the function of a primer. They form a light colored background and enable overlying indicia or outer layer 238 to be visible when formed on layer 236. Overlying indicia or outer layer 238 is the layer visible on the surface of ticket 202 before scratch-off material is removed. It is typically of uniform consistency and typically comprises four color graphics ink.

The layers of game ticket 202 can be formed using any one of a number of possible printing methods, for example, by way of gravure printing, silk screen printing, or offset printing. Most preferably, however, layers are printed on ticket 202 by way of a flexographic printing using a flexographic printing press. Although printing parameters such as layer thickness cannot be tightly controlled using flexographic printing, flexographic printing provides high volume printing at low cost.

It is stressed that the cross section diagram of FIG. 2-5 illustrates the construction of a typical prior art game ticket, but that many possible designs for lottery game tickets are possible that are functionally equivalent to the design shown in FIG. 2-5. For example, the three carbon black layers 230, 231 and 232 can be substituted for by a single light blocking layer comprising carbon black or another light blocking material having light blocking characteristics equivalent to the three layers 230, 231 and 232 in combination. The function of priming layers 234, 235 and 236 can likewise be provided by more or fewer layers having equivalent optical characteristic. Printing each layer 226–238, at substantially equal thicknesses simplifies the printing process.

An embodiment of a possible improved design for a lottery game ticket is shown in FIGS. 2-6 through 2-8. In this embodiment, scratch-off material comprises light blocking material that is formed on play area 210 in a predetermined fragmented pattern. Light blocking material 240 (FIGS. 2-7 and 2-8) typically comprises carbon black, but also may comprise other material which prevents light from passing through a game ticket.

By the light blocking material being formed on a game ticket in a "fragmented pattern", it is meant that some regions of the play area will have light blocking material formed thereon and some regions of the play area will not be covered by light blocking material when the ticket is first manufactured. As shown in FIGS. 2-6 through 2-8, light blocking material 240 should be formed in play area 210 in a sufficient amount so that the light blocking material partially obscures indicia icons (variable data) of the game ticket. However, light blocking material 240 should also be formed in sufficiently small amounts so that discernible spaces 242 are present between regions of the play area covered by light blocking material and regions not covered by light blocking material, as seen in the enlarged play area view of FIG. 2-7.

Light blocking material 240 may comprise a single layer or multiple layers. The predetermined pattern with which light blocking material is formed on ticket 202-2-6 may take on a variety of different forms. In the example of FIGS. 2-6 and 2-7, light blocking material 240 is formed in a grid pattern comprising intersecting horizontal and vertical "lines" of light blocking material. The light blocking material can also be formed, for example, in a parallel line pattern, a dot pattern, a spiral line pattern, etc.

As will be described in section III herein, applying light blocking material in a predetermined fragmented pattern facilitates machine detectability of a "lifting" tampering scheme carried out by a ticket agent. In a lifting tampering scheme, a ticket agent or probability game ticket player removes a section of the scratch-off material, then reapplies the scratch-off material or replaces the scratch-off material.

In Section III, a material detection imaging system is described that can accurately construct image data representations representative of the pattern of scratch-off material present on a game ticket. It is recognized that if scratch-off material is applied uniformly to a game ticket then image data representing a play area prior to removal of scratch-off material would not be readily distinguishable from image data representing a play area comprising uniformly reapplied or uniformly applied replacement scratch-off material if the replacement scratch-off has light blocking characteristics similar to that of the original scratch-off material.

By contrast, image data representing a play area prior to scratch-off removal in the case scratch-off material is applied in a predetermined fragmented pattern would be readily distinguishable from image data representing a tampered ticket wherein a section of scratch-off material applied in a predetermined fragmented pattern is removed and replaced with uniformly applied counterfeit scratch-off material.

One possible drawback with the game ticket configuration of FIG. 2-6 is that indicia icons 223 are partially visible through spaces 242 between areas of a play area covered by scratch-off material. An embodiment of a game ticket 202-2-8 adapted such that the form of indicia icons cannot be readily determined by viewing sections of exposed icons through spaces 242 is illustrated in FIG. 2-8. The embodiment of FIG. 2-8 includes an additional obscuring ink layer 251. The major requirement of obscuring ink layer 251 is it includes a level of transmissivity greater than that of light blocking material 240 but less than that of primer layers 234, 235 and 236. Preferably, obscuring ink layer 251 includes a level of transmissivity at about the level of transmissivity of indicia icon layer 226. Obscuring ink layer may be formed directly on substrate 218 or over any layer 226, 228, 230, 231, 232, 234, 235 and 236, but is preferably formed on release layer 228 or on a layer above release layer 228 so that indicia icon layer is not obscured by obscuring layer when scratch-off material 211 is removed.

FIG. 2-9 shows another embodiment of an improved game ticket. The embodiment of FIG. 2-9 is configured so that the game ticket is impervious to electrostatic fraud discussed in the background herein. Game ticket 202-2-9 includes a neutralizing layer 252. A requirement of neutralizing layer 252 is it includes a chemical composition that is substantially identical or equivalent to that of indicia icon layer 226. There is not a requirement, however, that neutralizing layer 252 have a similar opacity or transmissivity level as indicia icon layer 226 in order to prevent electrostatic fraud. Neutralizing layer 252 may be formed on substrate 218 or on any one of layers 226, 228, 230, 231, 232, 234, 235 and 236. However, if layer 252 is formed below release layer 226 then neutralizing layer 252 should be formed to have an opacity less than that of indicia icon layer 226 so that indicia icons 223 are visible when scratch-off material 211 is removed.

Indicia patterns formed on instant lottery game tickets as can be seen from FIGS. 2-1 to 2-4, and 2-10 can be quite intricate. Furthermore, there is no standard pattern of indicia for the various styles of game tickets. The outer layer 238 of scratch-off material covering the play area of a game ticket can be of any indicia pattern and color combination and the indicia icon layer underneath the scratch-off material can comprise any indicia pattern or any color combination as well. Therefore, in prior art game tickets there is no standard contrast pattern in lottery game tickets under white light or under narrow band illumination corresponding to either the condition of a scratch-off material being scratched or unscratched. As will be seen herein, an important step in the validating and/or authenticating a lottery game ticket is to accurately capture data indicating the locations of a game ticket's play area having scratch-off material removed. Section III herein describes various systems for capturing image data which indicated the location of a play area having scratch-off material removed which allow for game tickets of varying styles to be manufactured in varying indicia patterns and in color combinations that vary from ticket style to ticket style.

III. Material Detection Systems

A light transmissivity based scratch-off material detection system generally indicated at 302, which is adapted to capture images representing a play area of a lottery game ticket, is shown in the functional schematic diagram of FIG. 3-1. System 302 includes an image sensor 304, and a specialized light source 306. System 302 may also include imaging optics 307, illumination optics 308, and a mechanism (not shown in FIG. 3-1) for positioning game ticket 202 in a fixed or moving position in the optical path between light source 306 and image sensor 304. System 302 is adapted to capture images which can be processed to determine the regions in a play area of a game ticket in which scratch-off material has been removed.

Light source 306 is selected so that light rays emanating from source 306 are transmitted substantially through each layer 218, 226, 228, 230, 231, 232, 234, 235, 236 and 238 of the ticket (as shown in FIG. 2-5) excepting light blocking layers 230, 231 and 232. It has been found that when light source 306 emits light in the visible spectrum of between about 200 nm and 1000 nm, then very little light is transmitted through any of the layers of document 202. However, when light source 306 is selected to emit light having wavelengths longer than visible light wavelength, then a substantial amount of light is transmitted through each layer of document 202, with the exception of light blocking layers 230, 231 and 232 which block substantially all light emanating from source 306. Preferably light source 306 is selected to emit light in the infrared light range in the spectrum of between about 0.75 μm and 1000 μm. Most preferably, light source 306 is an infrared LED light source. Most commonly available image sensors can readily detect light rays in the infrared light wavelength range.

Image sensor 304, which may be provided by virtually any off-the-shelf 1D, 2D, or single pixel (photodetector) image sensor, is responsive to forms of light outside the visible light spectrum, including infrared light. Accordingly, light rays which pass through regions of ticket 202 not covered by scratch-off material will be detected by image sensor 304 while light rays which are blocked by light blocking layer 230 will not be detected by image sensor 304.

In the case where it is desired to determine whether a single point in a play area contains scratch-off material, image sensor 304 may be provided by a single element photodetector. In the case where it is desired to determine whether a line or "slice" of a play area contains scratch-off material, then image sensor 304 may be provided by a single element photodetector and ticket 202 may be transported across the field of view of sensor, or else image sensor may be provided by a 1D N×1 pixel array image sensor.

In the case where it is desired to capture comprehensive image information corresponding to an entire play area, image sensor 304 should be provided by a 1D or a 2D image sensor operating under the control of a processor based control system which is adapted to capture 2D bit map images representing the entire play area. An exemplary embodiment of a 2D image capture system utilizing a 1D N×1 pixel array image sensor as system sensor 304 is described in detail in Section V herein.

FIG. 3-2 shows a lottery game ticket having a portion 209 of scratch-off material removed from its play area 210, and FIG. 3-3 shows a digital image 312 corresponding to a bit map representation of ticket 202 captured by a processor based controller in communication with an image sensor disposed in accordance with the system of FIG. 3-1. It is seen from digital image 312 that image sensor 304 detects light rays emanating from source 306 which pass through game ticket 202 not blocked by light blocking layers 230–232 but does not detect light rays from source 306 that are blocked by light blocking layers 230–232 of the ticket's scratch-off material. Thus, the region 209-d in the play area digital representation 210-d having scratch-off material removed is in clear contrast with the region 211-d corresponding to an area of a play area covered by scratch-off material. In the digital image of FIG. 3-3, the darkest light pixel value corresponding to regions in play area 210 not covered by scratch-off material have brightness levels approximately 2 times brighter than the lightest dark pixel values corresponding to regions in play area covered by scratch-off material. The high contrast in pixel values between pixels in a bit map corresponding to regions in a game ticket covered by scratch-off material and those not covered by scratch-off material enables certain patterns to be recognized in play area image data which are indicative of various ticket tampering schemes. Image processing algorithms which process high contrast play area image data from imaging systems designed in accordance with the system shown in FIG. 3-1 are described in detail in Section V herein.

The amount of light that is transmitted through an area of a game ticket not covered by scratch-off material varies greatly depending on the style of ticket, the materials of the ticket, the inks used, and the printing method. Nevertheless, for most styles of tickets, image data corresponding to an area of a ticket covered by scratch-off material is readily distinguished from image data corresponding to an area not covered by scratch-off material in a captured digital representation captured from an imaging system in accordance with FIG. 3-1. The contrast in a digital representation between an area of a game ticket covered by scratch-off material and an area not covered by scratch-off material can be enhanced with use of a simple thresholding procedure. For purposes of illustration, the brightest scratch-off representation pixel in the example of FIG. 3-3 has a gray scale value of about 22 while the darkest non-scratch-off region pixel has a gray scale value of about 40. Contrast of the digital representation can be improved by setting each pixel value less than about 30 to p=0, and by setting each pixel value above about 30 to p=255.

An alternative system, generally indicated at 330, for detecting scratch-off material on a game ticket is described with reference to FIGS. 3-4 and 3-5. In this system, a game ticket is specially configured for use in system 330. In particular, scratch-off material 331 of game ticket 202-3-4 is provided with an additive that emits radiant energy (which may be visible or nonvisible light) in a second band of wavelengths when radiated by radiant energy in a first band of wavelengths. Additives having such characteristics include luminophors or phosphors. The additive material is preferably incorporated in outer layer 238 of scratch-off material 211.

In other embodiments, the additive that emits radiant energy in the second band of wavelengths can be incorporated in a layer of scratch-off material other than outer layer 238 or in a specialized layer of formed material beneath the scratch-off material.

Energy source 332 of system 330 is selected to emit radiant energy in the range of wavelengths causing the additive to emit radiant energy at the second wavelength band. Image sensor 334 meanwhile, may be provided by an off-the-shelf single pixel photodetector, 1×N pixel array image sensor or N×N pixel array. Receive optics 336 associated with image sensor should include a light filter for filtering out light not in the second band of wavelengths. In the system of FIG. 3-4, the second band of wavelengths at which the document emits may be a band of wavelengths identical to or which encompasses or overlaps the first wavelength band at which source 332 emits.

In a preferred embodiment, system 330 is controlled by a processor-based control unit which controls a 1×N pixel array image sensor, and captures image data from image signals generated by sensor 334. The controller also typically controls a transport mechanism for transporting a document across a field of view of sensor so that the controller can construct 2D images from 1D "slice" image signals generated by sensor 334. Such a system is described in detail in Section V herein.

Another scratch-off material detection imaging system for producing high contrast images representing a play area, which, like the system of FIG. 3-4 includes a game ticket specially configured for use in system is described with reference to FIGS. 3-6 through 3-9. System 340 comprises image sensor 342 which, like image sensors 304 and 334 may be virtually any commercially available image sensor, but preferably a 1D linear array image sensor which is controlled to generate image signals used in constructing 2D images. Illumination source 344, meanwhile, is a narrow band illumination source, typically a red light source or a green light source.

As mentioned in Section II, it is preferred that the play area of a game ticket 202 comprises colorful patterns, both on the visible portion of outer layer 238 and variable data icon layer 226. Providing colorful patterns of indicia with outer layer 238 on and with indicia icon layer 226 enhances the attractiveness of lottery game tickets. Unfortunately, if the materials used for producing the colors of a play area in various styles of tickets are selected based on the color of those materials in white light, and the color selection varies from ticket style to ticket style, as is the case with prior art tickets, then a conventional imaging assembly will not produce images in which a high contrast is apparent for all tickets of various styles between pixels representing a play area section covered by scratch-off material and an area having scratch-off material removed.

In a game ticket 202-3-6 for use in the system of FIG. 3-6, the manufacturing of ticket 202-3-6 is controlled so that the colors of the exposed layers of a game ticket (either indicia icon layer 226' or outer layer 238'), for each of various styles of ticket, exhibit predetermined reflectance patterns under exposure to a specific narrow band source of illumination. Different colors, and different shades of colors as seen in white light can have substantially identical or similar reflectance characteristics when illuminated by a narrow band illumination source. According to the system of FIG. 3-6, the manufacturing specifications of tickets for various styles of tickets are controlled so that the outer layer 238' and indicia icon layer 226' have patterns and colors that may vary for each style of ticket, but predetermined reflectance characteristics within an acceptable range for each style of ticket. Preferably the reflectance characteristics of a play area outer layer 238' and icon layer 226' are substantially similar within an acceptable range for each of the various styles of tickets manufactured, so that for each style of ticket, a reflectance measurement under illumination by a specific narrow band source at a given point in a ticket within a certain range indicates the presence of, or the absence of, scratch-off material at that given point for all ticket styles manufactured in accordance with the detection system.

The color as seen in white light and reflectance characteristics of the exposed portion of outer layer 238' and icon layer 226' can be influenced by a number of different factors, for example, the thickness of the layer formed, the type of material used in forming the exposed layers, the opacity of the layer on which the exposed layer is formed, and the absorption characteristics of the layer on which the exposed layer is formed. In general, the color of the exposed portion of outer layer 238' and icon layer 226' can be adequately controlled by assuring that substrate 218 and priming layers 234, 235 and 236 are highly opaque when layers 238' and 226' are formed thereon, and by assuring that priming layer 236 has dried sufficiently when layer 238' is printed thereon.

Furthermore, it is understood that the indicia patterns of the play area of a game ticket do not have to be formed by way of printing ink layers. For example, the colors of a game ticket's play area can also be controlled by dying areas of a document according to a predetermined method.

In one illustrative embodiment, all styles of tickets in a group of tickets are manufactured so that all exposed colors of outer layer 238' for each style of ticket have a first reflectance measurement when illuminated in a specific narrow band of light, and all colors of indicia icon layer 226' for each style of ticket have a second reflectance measurement when illuminated in the same narrow band. For example, a group of tickets may be manufactured so that all colors of outer layer for each style of ticket exhibit about 100% reflectance to red light, and all colors of indicia icon layer 226' exhibit about 0% reflectance to red light.

A one cell play area designed in accordance with this example, under white and red light lighting conditions is illustrated in FIG. 3-8. FIG. 3-8 is a grey copy of a color image but is useful in illustrating the invention. Under white light, indicia patterns 346 and 347 are present in the visible portions of both outer layer 238' of scratch-off material and in indicia icon layer 226'. However, under red light illumination, outer layer 238' is uniformly white and icon layer 226' is uniformly black. When a portion of scratch-off material is removed, then the exposed portion icon layer 226', appearing uniformly black, is in discernible contrast with scratch-off material, appearing uniformly white.

Of course, the colors of the ticket do not have to exhibit precise reflectance (such as about 0% or about 100% reflectance) characteristics under narrow band illumination for the system to be operational. Once a grey scale bit map is captured from image sensor 344, the pixel values can be subjected to a thresholding procedure to binarize pixel values of the bit map or to otherwise convert pixel values within a range of pixel values to a discrete pixel value. Thus, the colors of layer 238' and layer 226' can be within any reflectance measurement range under narrow band illumination as long as the reflectance measurement ranges for layer 238' and 226' are consistent for each style of ticket that is manufactured.

By exerting additional controls over the reflectance characteristics of colors forming outer layer 238', and icon layer 226', additional information can be yielded through imaging of a ticket under narrow band illumination. For example, the pattern color and background color of each of the outer layer 238' and the icon layer 226' can be selected to have reflectance measurements at different values or within separate ranges. In an illustrative example, the color or colors forming the background of the outer layer 238' are made to have a reflectance measurement under red light of 100%, the colors(s) forming the indicia pattern of outer layer 238' are made to have reflectance measurements of about 67%, the colors forming the background of icon layer 226' are made to have reflectance measurements of about 33%, while the colors forming indicia icons 223 are made to have reflectance measurements under a narrow band source illumination of about 0%.

In a system wherein the play areas of game tickets are manufactured in colors having four values or ranges of reflectance measurements under narrow band illumination, then in an image captured from sensor 342, a region of a play area covered by scratch-off material is in discernible contrast with a region not covered by scratch off, an indicia pattern 349 of outer layer 238' is in discernable contrast with background 348 of outer layer and an indicia pattern 351 of indicia icon layer 226' is in discernable contrast with background 350 of icon layer 226'.

Contrast, in a captured image, between several different sections (e.g. outer layer to indicia layer backgrounds, indicia layer pattern to indicia layer background, outer layer pattern to outer layer background) of a game ticket can also be provided by providing in system 340 more than one narrow band illumination source as indicated by dashed light source 344'. For example, system 340 may include a red light source and a green light source.

Many colors (as seen in white light) have very different reflectance measurements when illuminated by different types of narrow band illumination. For example, reddish shades as seen in white light tend to reflect about 100% of narrow band red light, but 0% green light. Green shades as seen in white light reflect about 0% red light and about 100% green light. Other shades reflect about the same red light as green light. For example, yellows as seen in white light reflect about 100% red and green light whereas purple shades as seen in white light reflect about 0% of red and green light.

By providing multiple sources of narrow band illumination, a first image can be captured under illumination by a first narrow band source that has different contrast characteristics than a second image captured from sensor 342 under illumination by a second narrow band source.

In the example of FIG. 3-9 (a grey copy of a color image is shown) the background 348 and pattern 349 of outer layer 238' are 100% reflective to red light but under green light the background 348 is 100% reflective, while the pattern 349 is 0% reflective. The background 350 and pattern 351 of indicia icon layer 226' are 0% reflective to red light, but under green light, the pattern is 100% reflective, while the background is 0% reflective. Thus, under red light, a contrast is apparent between an area covered by outer layer 238' and an area where indicia icon layer 226' is exposed, while under green light, contrast is apparent between a pattern and background in both the outer layer 238' and in icon layer 226', where the variable data indicia icon layer is exposed.

IV. Branding System

In one major aspect of the lottery game ticket reader of the present invention, lottery tickets are made to be "brandable" and apparatus 402 for processing the tickets as shown in FIG. 4-1 includes a certain energy source 404 which "brands" game tickets when processing them. A "brandable" game ticket is one that includes a material formed thereon which is invisible to the human eye before being exposed to the energy source, and which remains unactivated in ambient light, but which becomes visible when exposed to certain radiant energies such as heat or light within a particular wavelength range. In the present invention, a radiant energy source, or "brander" 404 is incorporated into an automatic game ticket processing apparatus 402 which may include a transport mechanism 406 for transporting tickets through apparatus, and certain processing components, such as at least one imaging assembly 408 and an associated controller (not shown) for capturing image data representing a game ticket from image signals generated from imaging assembly, and for decoding any bar code symbols which may be included in the image data. After being branded, the activated brandable material on the ticket becomes visible to indicate to person handling that the ticket has been previously played.

As shown in FIG. 4-2, game ticket 202 may have brandable ink formed thereon in accordance with the configuration described in U.S. Pat. No. 5,109,153 to Johnsen et al., incorporated herein by reference. Johnsen et al. describe a lottery game ticket, or another document, which includes a machine readable bar code symbol. According to Johnsen et al., brandable material is formed directly on the bar code symbol at such a location that when the material is branded, the machine readable code is rendered unreadable. The marking which becomes visible when the ticket is branded provides two functions. First, the brandable material when branded indicates to a ticket handler that the ticket has been played. Second, the brandable material when branded can prevent machine reading of the bar code symbol on the ticket. In the embodiment shown in FIG. 4-2, brandable ink 412 shown in a branded state is formed on ticket over a bar code symbol 410 such that when branded the ink forms characters of the word "void" and obscures symbol 410 so that the symbol can be rendered unreadable by a machine reader.

In another embodiment, illustrated with reference to FIG. 4-7, brandable material 412' shown in a branded state is also formed directly over identification bar code symbol 410. However, according to this embodiment, and contrary to the teachings to Johnsen et al., symbol 410 is not rendered unreadable by a bar code machine reader when the brandable material is branded. A document processing apparatus configured to process a ticket designed in accordance with the embodiment of FIG. 4-7 will, in general, be able to read the symbol after the symbol is branded, and at the same time recognize that the symbol has been branded by recognizing the pattern in which brandable material on the document is formed.

Either of the embodiments described with reference to FIG. 4-2 and FIG. 4-7 are useful in preventing the fraud scheme in which a ticket agent or player removes a bar code symbol from a winning ticket and attaches the symbol or a copy thereof to a losing ticket.

Brandable material may also be formed on a location of a ticket other than on symbol 410. When branded the existence of visible brandable material indicates to a visual observer that the ticket has been played. However, such embodiments are generally not preferred for the reason that they do not address the fraud of removing a winning symbol from a processed ticket and applying the symbol to a losing ticket.

The brandable material which is formed on game ticket can be provided, for example, by a reactive ink. Preferably, however, brandable material is provided by thermochromatic ink.

The selection of the appropriate brander 404 or radiant energy source will vary on the type of brandable material formed on game ticket 202. If the brandable material is of the type that becomes visible in ambient light when exposed to a light source in a specific wavelength range, then brander 404 is provided by a light source that emits light in that specific wavelength range. If the brandable material is of the type that is activated in response to heat, then brander 404 should be provided by a heat source. When the brandable ink is a thermally sensitive material (such as thermochromatic ink), then brander 404 may be a heat source such as a high intensity white light source that emits heat to a temperature sufficient to cause branding of the selected brandable material.

One possible drawback with the branding system of the functional diagram of FIG. 4-1 is that heat generated by brander 404 when provided by an energy source emitting heat, may have a negative affect on the structural integrity of game ticket 202, or on the various electrical components of apparatus 402 over time. Thus, when brander is provided by an energy source giving off substantial heat, the source must be carefully selected and positioned so that source 404 gives off enough heat to activate the brandable material on ticket 202 but not so much that the generated heat affects other material of ticket or other components of the processing apparatus.

An alternative branding system in which heat is applied in comparatively small quantities to localized areas of a game ticket or of another type of document such as a coupon, or a sporting or entertainment event ticket is described with reference to FIGS. 4-3 to 4-6. In the document shown in FIG. 4-3, a conductive, printable material is formed on document 418 according to a predetermined pattern such that, when a potential is applied across ends of the document 418, there is a relatively high voltage drop in at least one localized area of the document as compared to the voltage drop over the remainder of the document. In accordance with the invention, conductive printable material is formed on the document so that a relatively high voltage drop on the ticket takes place at the location or approximately at the location of the document where brandable material is formed.

The resistance of a uniform length of conductor is given by:

$$R = \frac{1}{\sigma s}$$

where l is the length of the section of the conductor, σ is the resistivity of the material, and s is the cross sectional area of the conductor section. Thus, it is seen that the resistance over any length of conductive material can be precisely controlled by controlling the cross sectional area of the conductive section.

In the specific examples of FIGS. 4-3 and 4-4, conductive printable material 420 is formed on document 418 such that a relatively high resistance section of resistive circuit comprising sections 421, 422 and 423 is formed about a region of a document desired to be exposed to a relatively higher amount of heat. The higher resistance section at or approximately at the location of the brandable material may be formed by a number of possible methods, for example by providing a conductive material having a higher resistivity in the location of the brandable material. Preferably, however, the higher resistance conductor section 422 is formed as is shown by providing a conductor section having a smaller area cross section than remaining conductive sections 421 and 423. In this way, all conductive sections of resistive circuit can be formed on document 418 by applying a single contiguous layer of conductive material. The precise resistance value of high resistance section 422 and the voltage of the voltage source which is applied to the ticket can be controlled so that high resistance section 422 generates the desired amount of heat at the brandable ink location of the document. If it is desired to brand more than one location of a document, document 418 can have more than one relatively high resistance section.

Preferably, the relatively high resistance section 422 exhibits a resistance in the tens of ohms or lower. This is so a relatively high resistance section is made to emit an amount of heat sufficient to cause branding of brandable material on a game ticket by applying a relatively low voltage source (such as a 5V voltage source) across a resistive circuit formed on a game ticket.

Brandable material and conductive material, like the layers 211 described with reference to FIG. 2-5 are conveniently applied in high volume using a flexographic printing press but may also be applied using an alternative printing method such as with the use of gravure printing, offset printing, or silk screen printing.

Figures 2, 3, 4, 5:
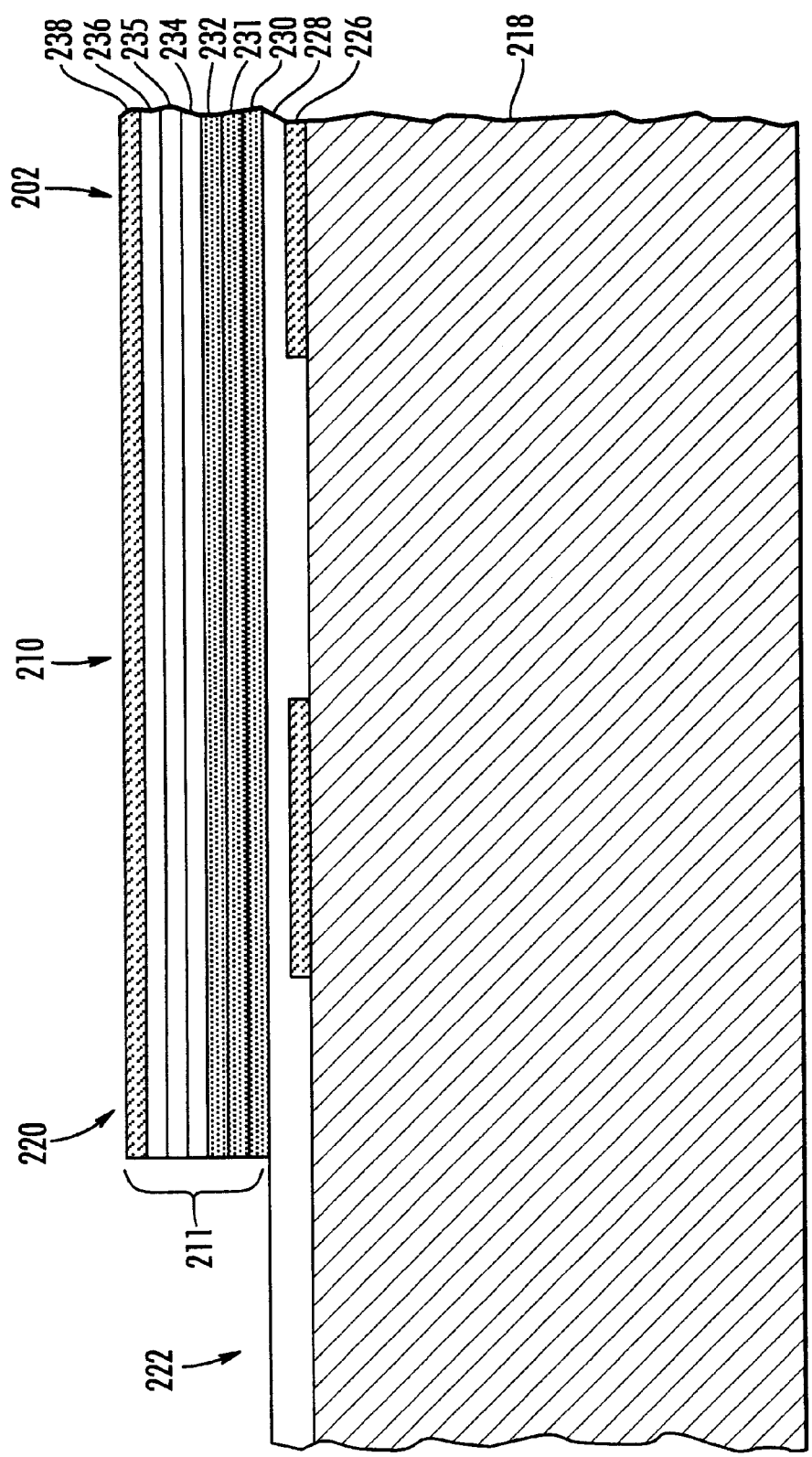
Figures 2, 3, 4, 5, 6:
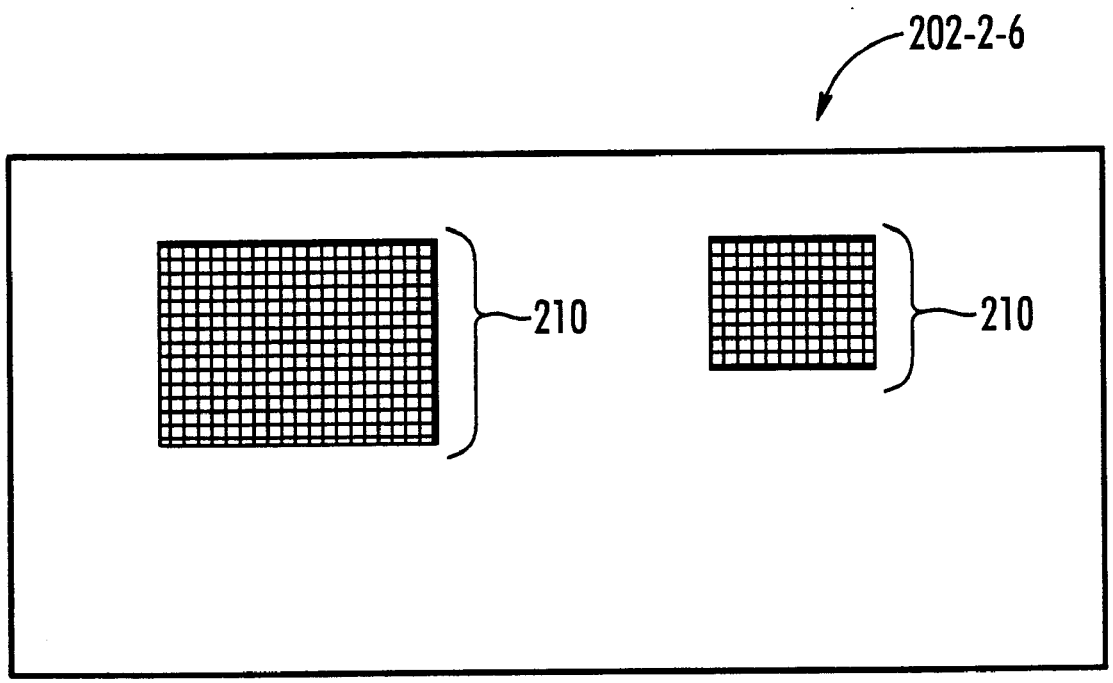

A document processing apparatus which is adapted to brand documents of the type shown with reference to FIGS. 4-3 and 4-4 is shown in FIGS. 4-5 and 4-6. Apparatus 430 includes feed path 432 for receiving documents, a voltage source 434 which may be either an AC or DC voltage source, and voltage terminals 436 adapted to make contact with end conductor sections, e.g. sections 421 and 423 of a document 418. In the embodiment shown, apparatus 430 is configured so that documents received therein are manually inserted into apparatus 430 until document 418 is in electrical contact with terminals 436. However, apparatus 430 can also be configured so that document 418 is transported into an appropriate position in contact with terminals by operation of rollers 406, as shown in FIG. 4-1 or another transport mechanism. Apparatus 430 can be configured so that document 418 is in motion while voltage is applied to document, or else apparatus 430 can be configured so that the document is in a stationary position during the time that branding voltage is applied to the document.

Document 418 can be made to have contact pads 425 formed thereon as shown in FIGS. 4-3 and 4-4. These contact pads can be made of highly conductive metals. The increased thickness of contact pads 425 and high conductivity assured good electrical connection between document and terminals, and assure that losses between document and terminal are minimal. Several contact pads 425 can be formed on a document as illustrated in FIG. 4-3 so that the document can be inserted into an apparatus for processing the document in any one of a plurality of different orientations and still engage terminals 436.

V. Document Processing Apparatus Control System

A specific embodiment of a multiple function apparatus according to the invention which is adapted to receive and process security documents, in particular lottery game tickets, is shown with reference to FIG. 5-1, which shows a functional schematic diagram of a document processing apparatus and its associated components, and FIG. 5-2, which shows a block electrical control system for controlling the components of the apparatus.

Lottery ticket reader 510 includes a plurality of elements adapted to carry out various functions in the reading and processing of lottery game tickets, such as game ticket 202. Reader 510 includes a housing 512, a transport mechanism 514 for transporting game tickets along a feed path 515, a first ticket sensor 544 for sensing the presence of a game ticket in housing 512, second and third ticket sensors 529 and 530 for sensing the presence of a document at specific points along feed path 515, a topside imaging assembly 516 for generating image signals corresponding to a topside 204 of a lottery ticket, a bottomside imaging assembly 517 for generating image signals corresponding a bottomside 206 of a lottery ticket, a material detection imaging assembly 519 of the type described in connection with FIG. 3-1 herein, and a brander 520 for branding brandable inks which may be formed on various lottery tickets which may be read by the reader of the invention.

Embodiments of reader 510 can have more than or fewer than the above components. Furthermore, as will be explained herein, reader 510 may be configured so that a user may elect to deactivate components and/or operations of reader 510 by entering control commands via control button or a keyboard 511 or from the local host processor system 558 (FIG. 5-2). Still further, as will be described herein, reader 510 may be configured so that certain components and/or operations of reader 510 may be enabled or disabled during operation of reader 510 based on characteristics of the game ticket that is currently being read.

Although imaging assemblies 516, 517, and 519 may incorporate 2D type image sensors, they preferably include 1D image sensors 522T, 522B, 522M having 1×N pixel arrays which are oriented and controlled so that controller 532 captures 2D images from image signals generated by the image sensors. 1D image sensors are disposed generally perpendicular to the direction of transport 514, and caused to generate image signal "slices" as documents are transported through feed path 515. Accurate image data representations of lottery ticket indicia can be captured by controller 532 (FIG. 5-2) by coordinating the frequency of image capture and speed with which documents are transported across the field of view of the imaging assemblies. The dimensions of 1D image sensors for use in reader 510 are selected based on the resolution requirements of the captured images.

The term "capture" as used herein in relation to imaging systems shall refer to the process by which a processor based controller 532 receives image signals generated by an image sensor e.g. 522T (in a digitized state after being digitized by A/D converter e.g. 522T) and constructs from the image signals an initial bit map corresponding to the signals and representative of the scene in the field of view of the image sensor.

Referring to particular aspects of imaging assembly 516, imaging assembly 516 may include an illumination source assembly 523T, provided typically by an array of LEDs, together with an illuminating optics assembly 524T, which may include lenses and/or mirrors for directing light from the illumination source to a target, which is a portion of a document presently in the field of view of the image sensor. Imaging assembly 516 further includes an imaging optics assembly 525T for receiving and focusing an image of object T onto image sensor 522T, and possibly an optical filter for filtering out light not in the band of wavelengths emanating from illumination source 523T.

Illumination and receive optical elements referred to herein may include mirrors of fiber optical elements for folding or otherwise shaping the illumination or receive optical paths.

Bottomside imaging assembly 517 typically includes components identical to topside imaging assembly 516. Bottomside imaging assembly 517 typically includes a 1D image sensor 522B and an associated imaging optics assembly 525B, an illumination source assembly 523B and associated imaging optics assembly 524B.

In the embodiment of FIG. 5-1, material detection imaging assembly 519 is configured in accordance with the transmissivity-based material detection system described in reference to FIG. 3-1. Material detection image sensor 522M is disposed to generate image signals representing a topside of a game ticket while illumination source 523M is disposed on a side of feed path 515 opposite image sensor to direct light through ticket toward image sensor 522M. Illumination source 523M is typically an infrared light source which emits light in the wavelength range of from about 0.75 $\mu$m to about 1000 $\mu$m. Receive optics 525M associated with material detection sensor 522M should include an optical filter for filtering out light not in the band of wavelengths emitted by illumination source 523M.

In a preferred embodiment of the present invention image sensors 522T, 522B are provided by high resolution 1D image sensors which generate image signals of sufficient resolution so that, when images corresponding to those images are captured by reader 510, fine lined (such as 6 mil) bar codes can be decoded in such images. The resolution requirements for images captured by material detection image sensor 522M may be less stringent, and therefore materials detection image sensor 522M can normally be provided by a lower resolution image sensor which generates lower resolution images.

Shown as being provided by a system of rollers, transport mechanism 514 could also be provided by an air transport system or a drum type transport system. In other possible embodiments, transport mechanism 514 may comprise simply a feed path which guides a document received therein and the document may be moved through the feed path by the force of gravity (in the case of a vertically oriented feed path) or by a manual force supplied by a ticket handler as suggested by the apparatus shown in FIGS. 4-5 and 4-6. In still other possible embodiments, a document may be held in a stationary position and transport mechanism may cause motion of image sensors 522T, 522B and 522M across the stationarily held document for enabling full document imaging.

Figures 2, 3, 4, 5, 6, 7:
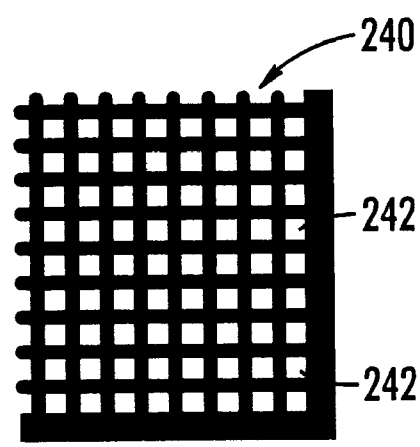
Figures 2, 3, 4, 5, 6, 7, 8:
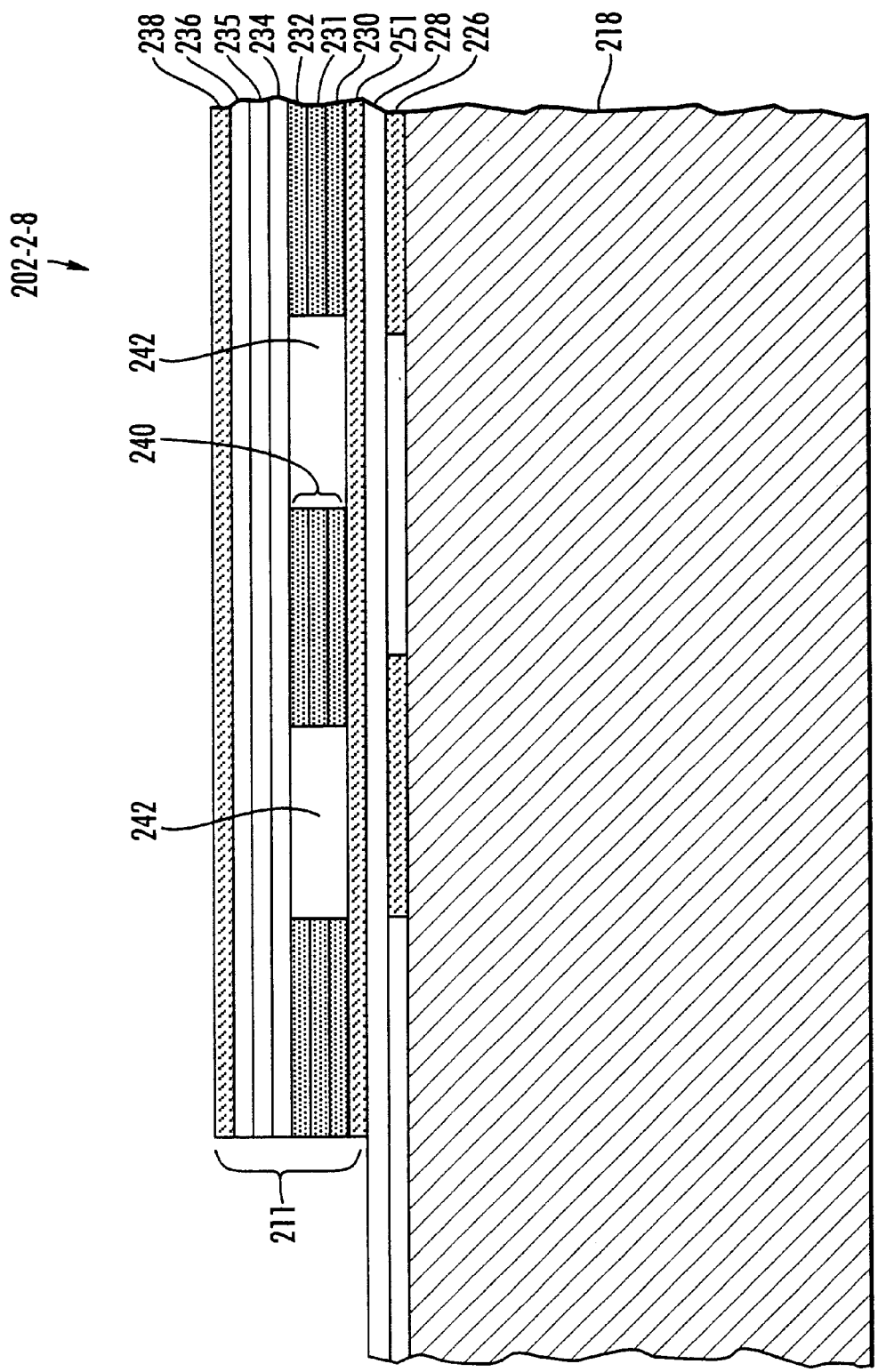
Figures 2, 3, 4, 5, 6, 7, 8, 9:
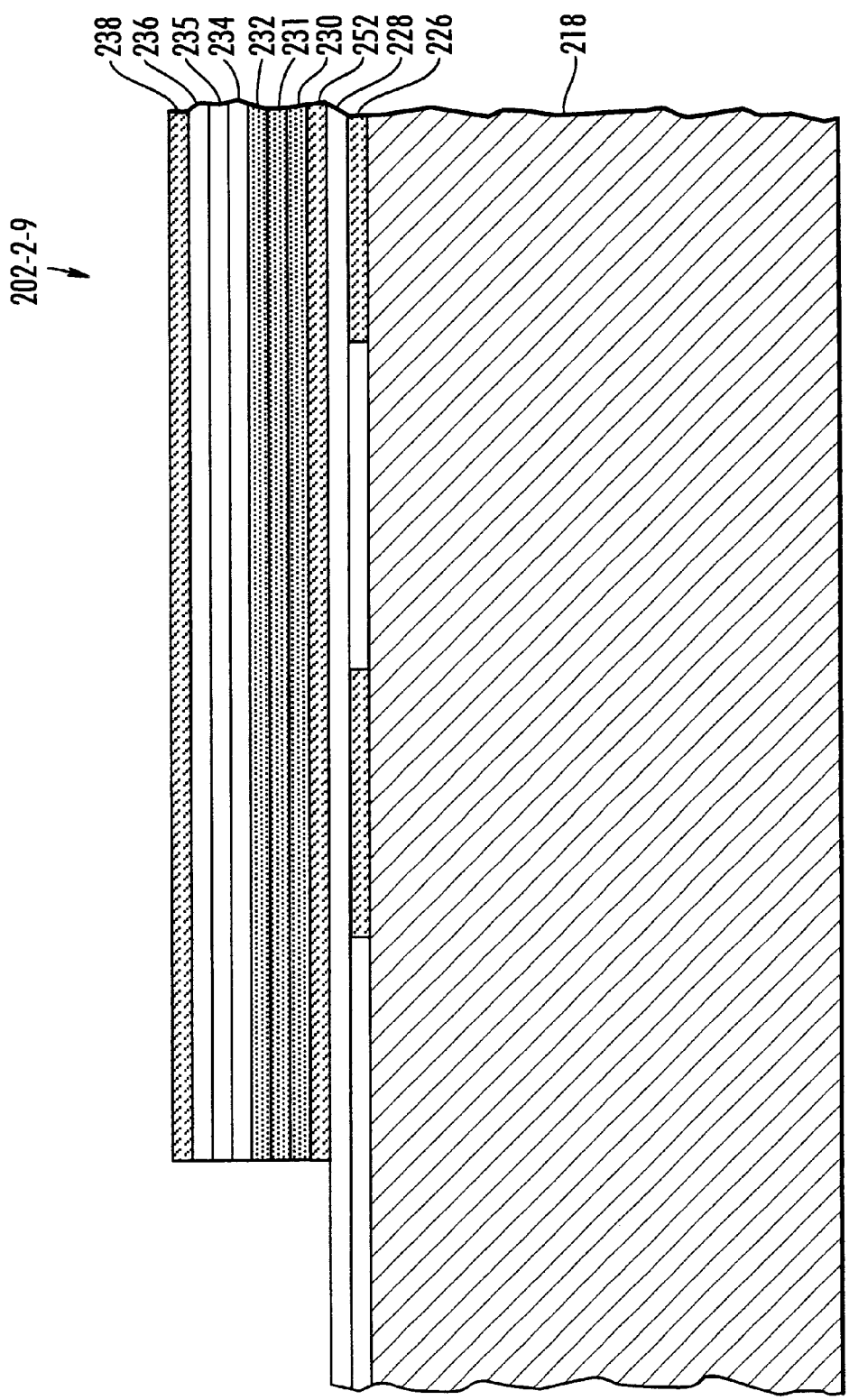
Figures 2, 3, 4, 5, 6, 7, 8, 9, 10:
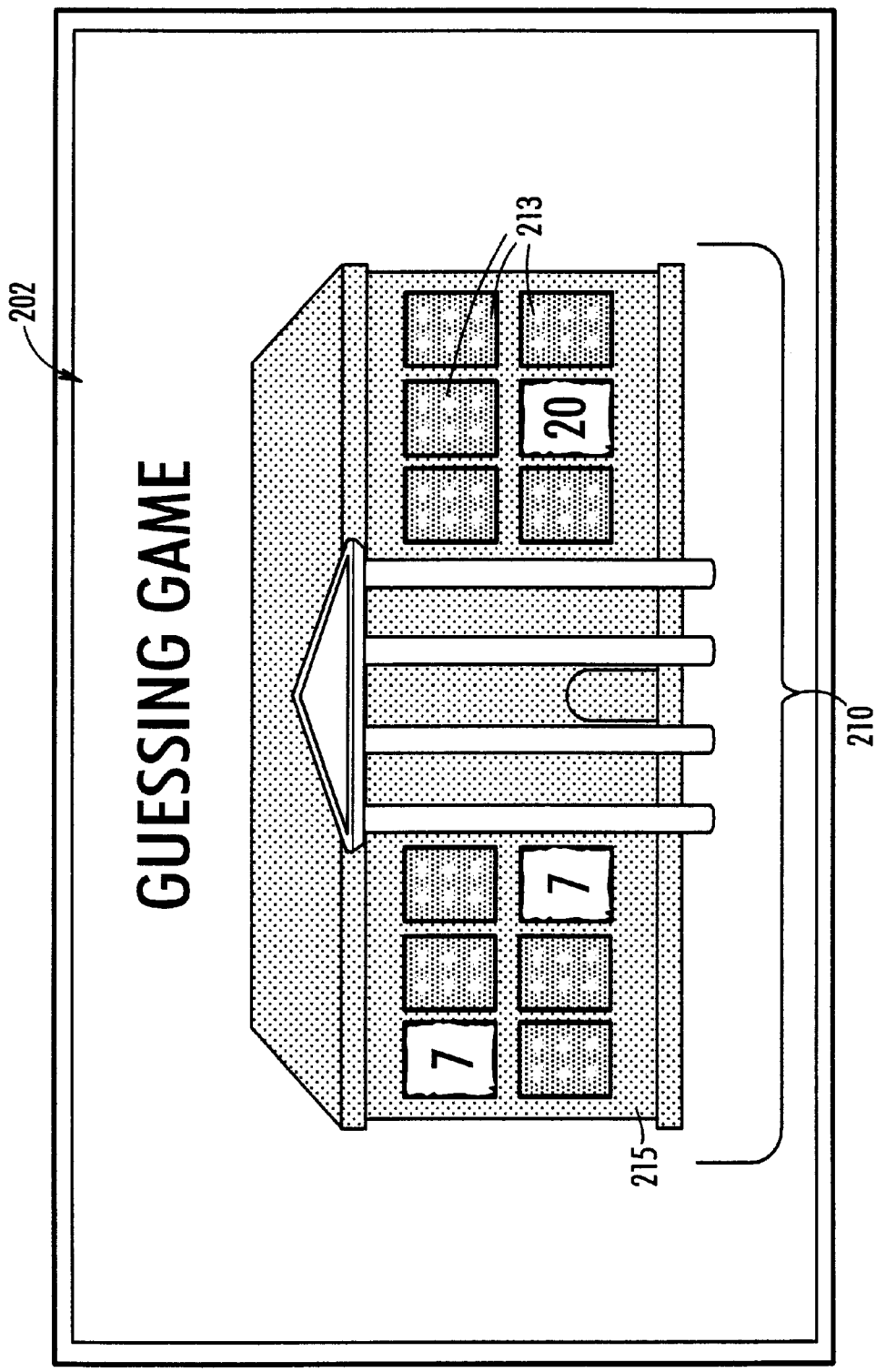
Figures 1, 3:
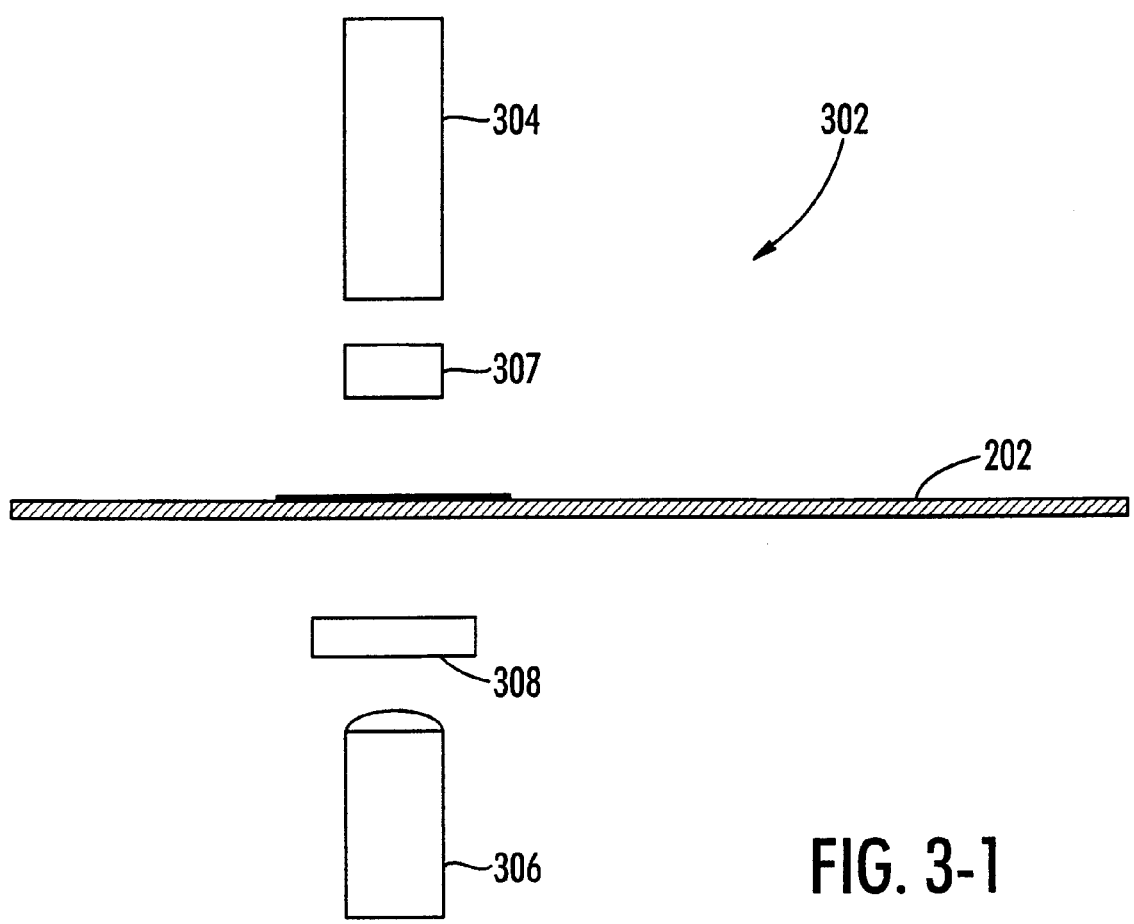
Figures 2, 3:
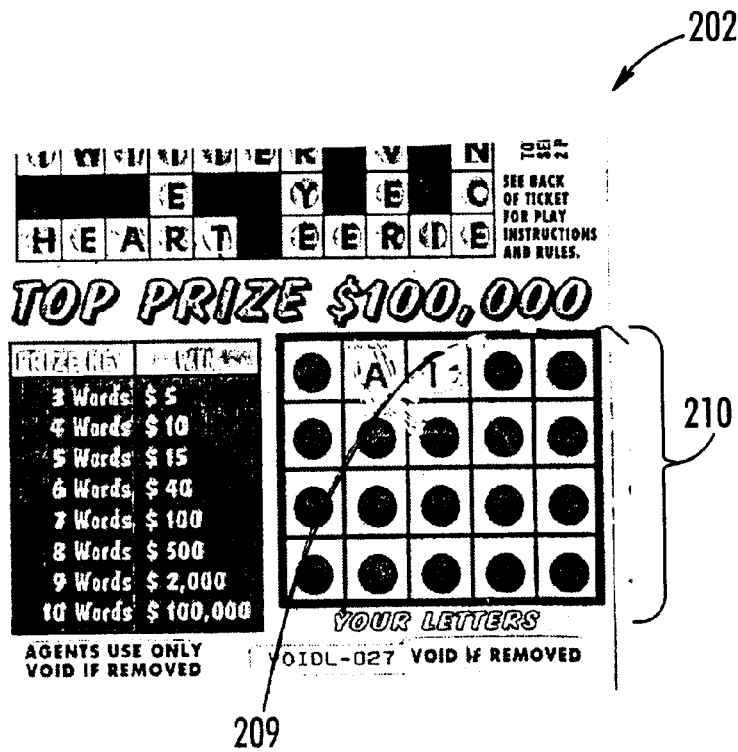
Figure 3:
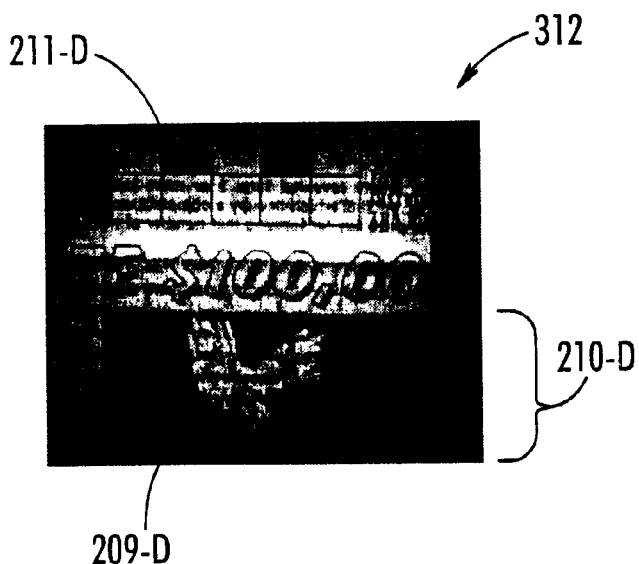
Figures 3, 4:
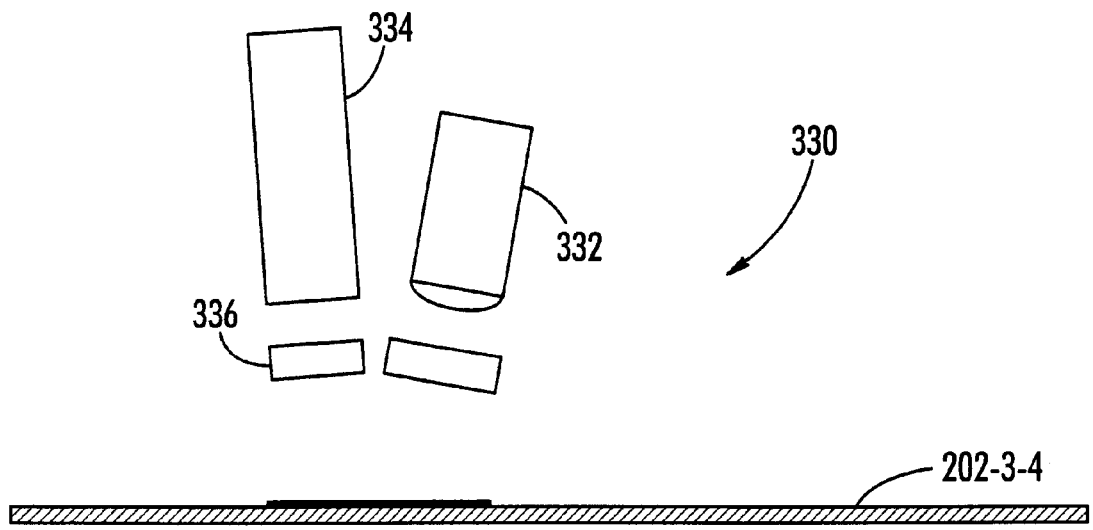
Figures 3, 4, 5:
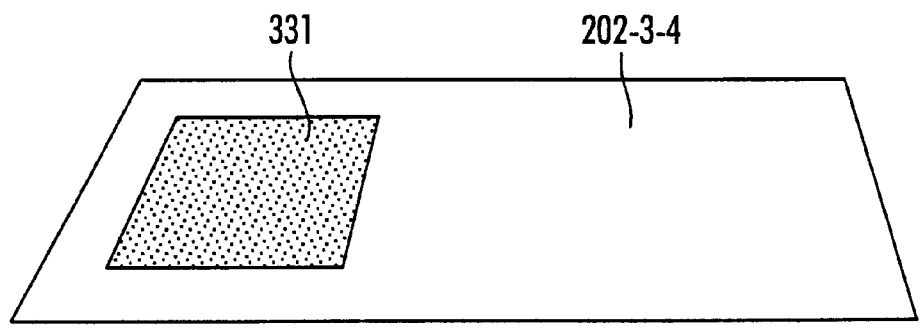
Figures 3, 4, 5, 6:
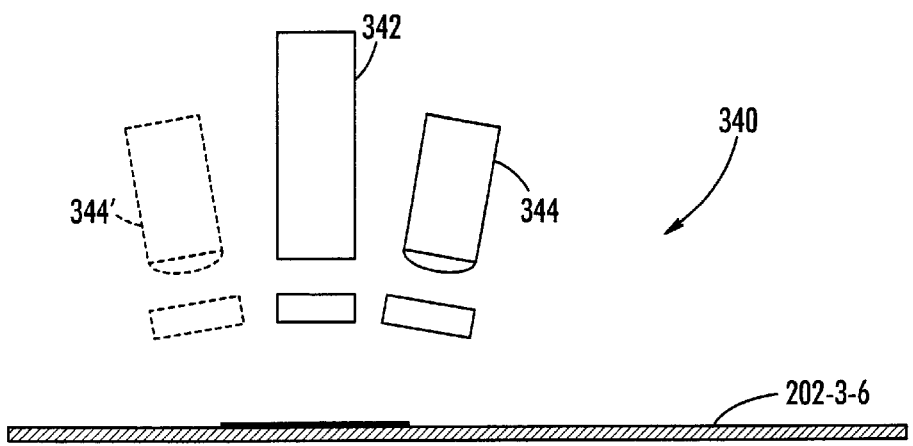
Figures 3, 4, 5, 6, 7:
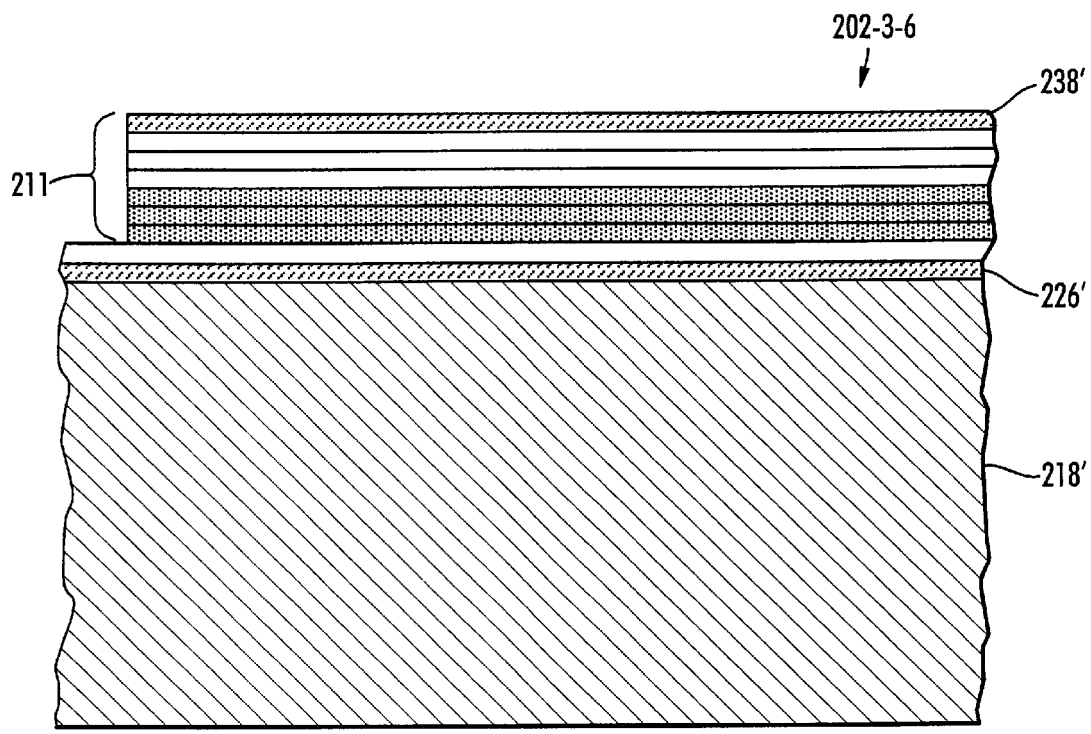
Figures 3, 4, 5, 6, 7, 8:
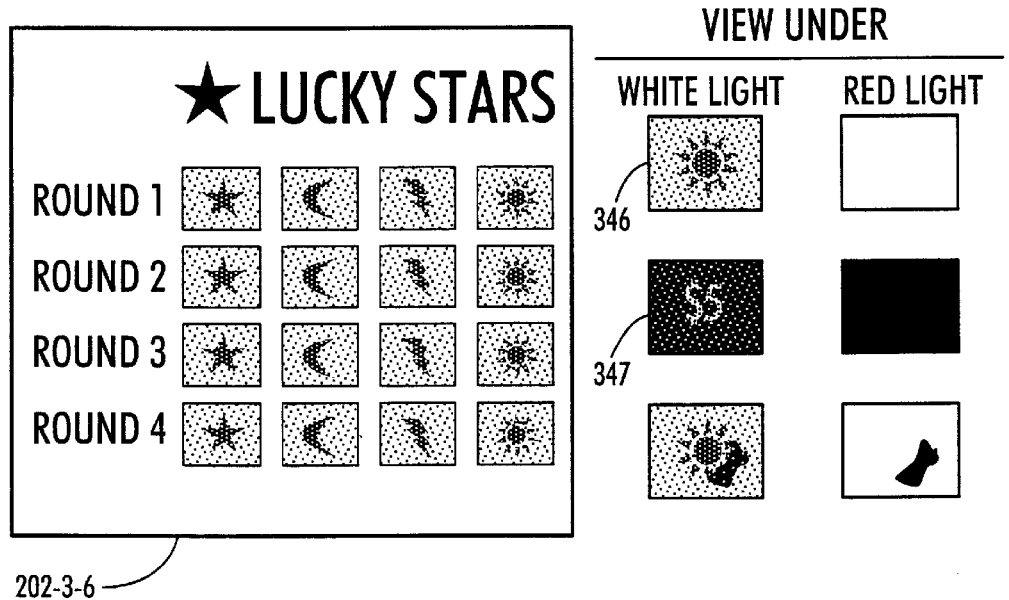
Figures 3, 4, 5, 6, 7, 8, 9:
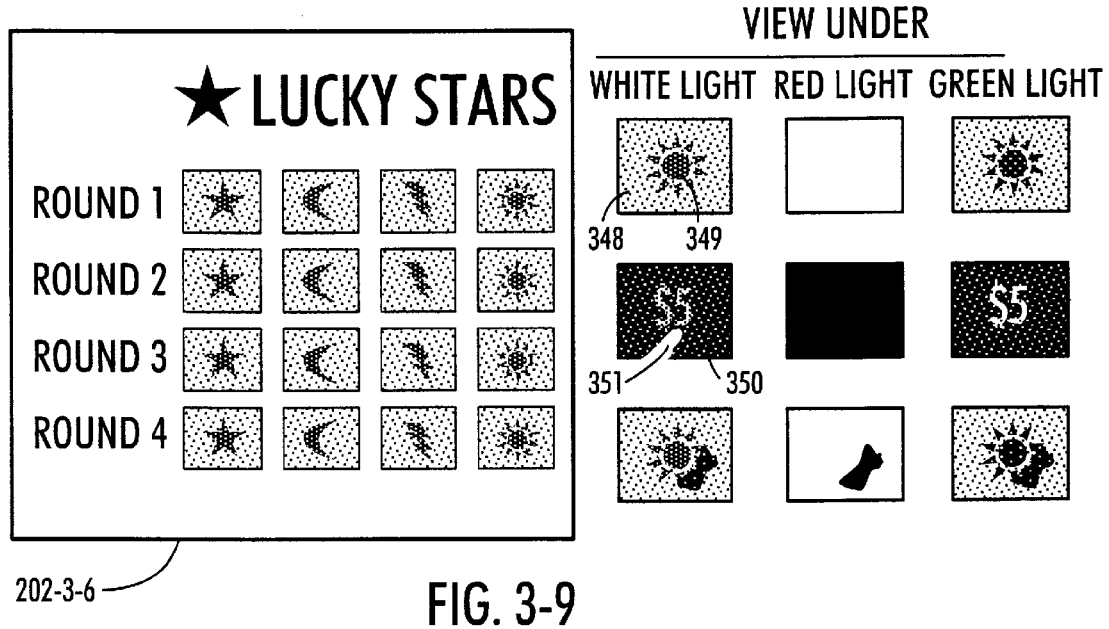
Figures 3, 4, 5, 6, 7, 8, 9, 10:
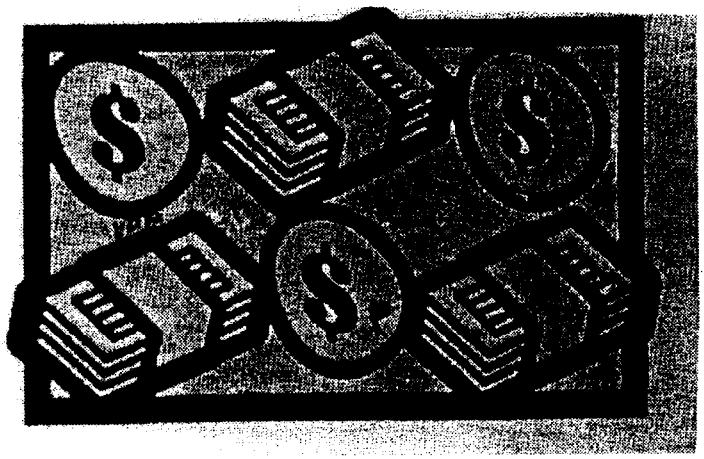
Figures 3, 4, 5, 6, 7, 8, 9, 10, 11:
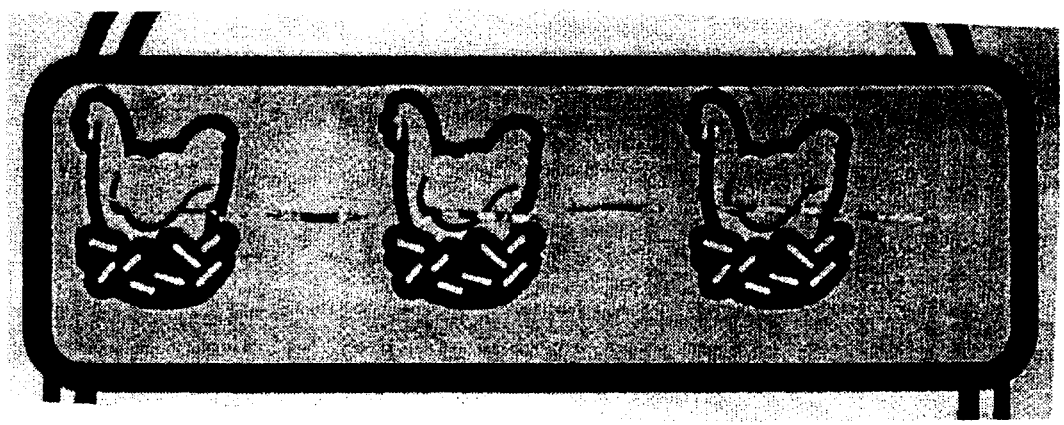
Figures 1, 4:
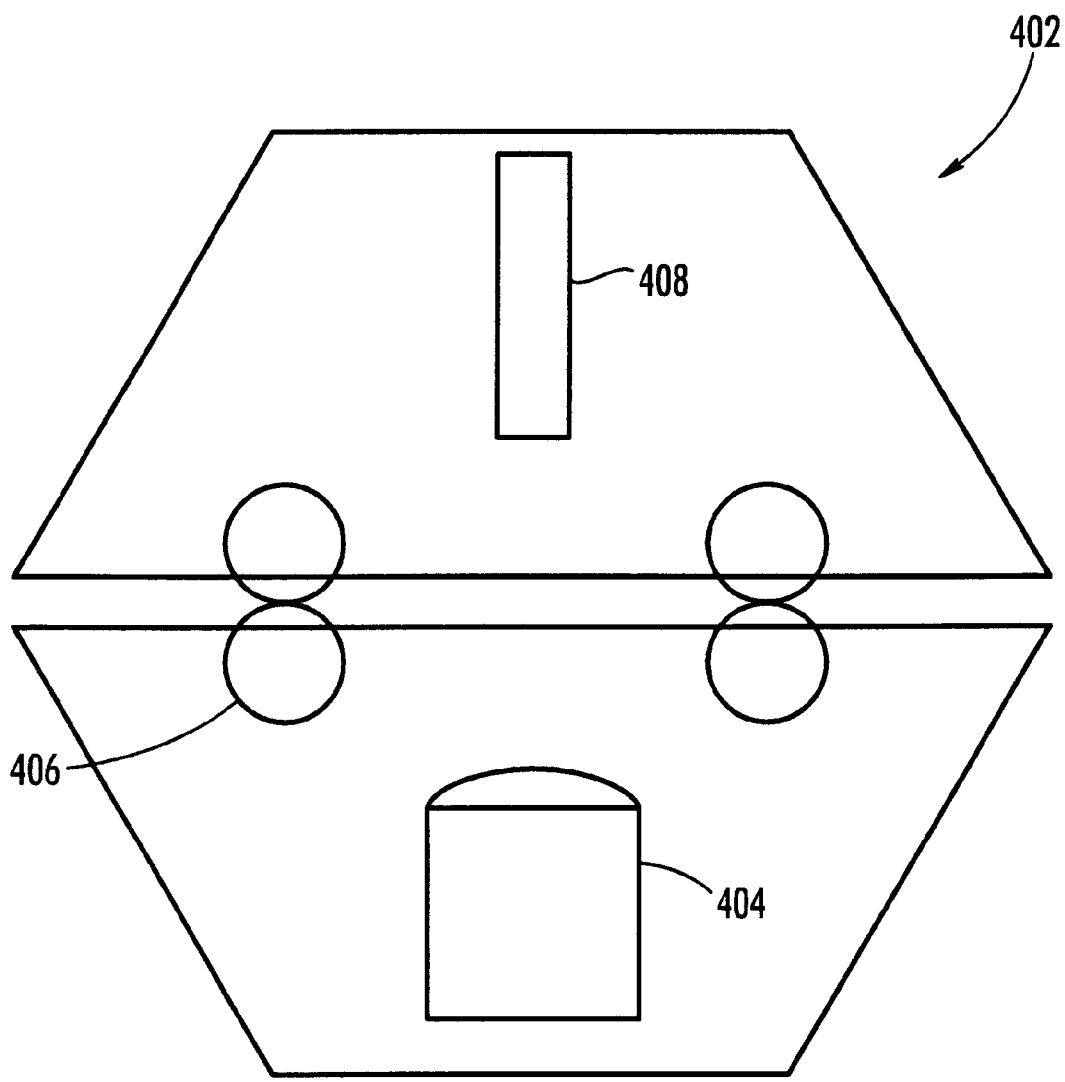
Figures 2, 4:
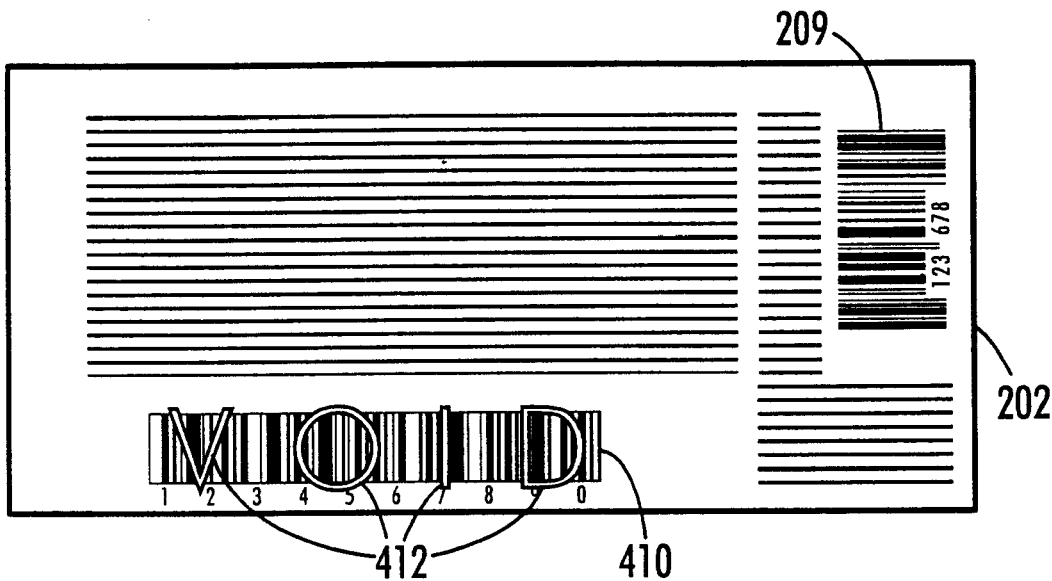
Figures 4, 5, 6, 7:
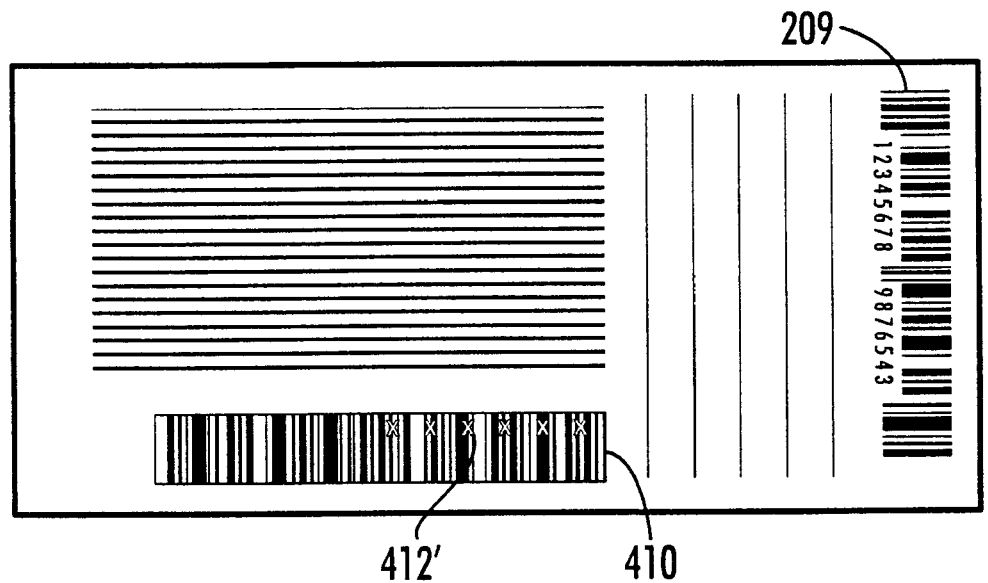
Figures 3, 4:
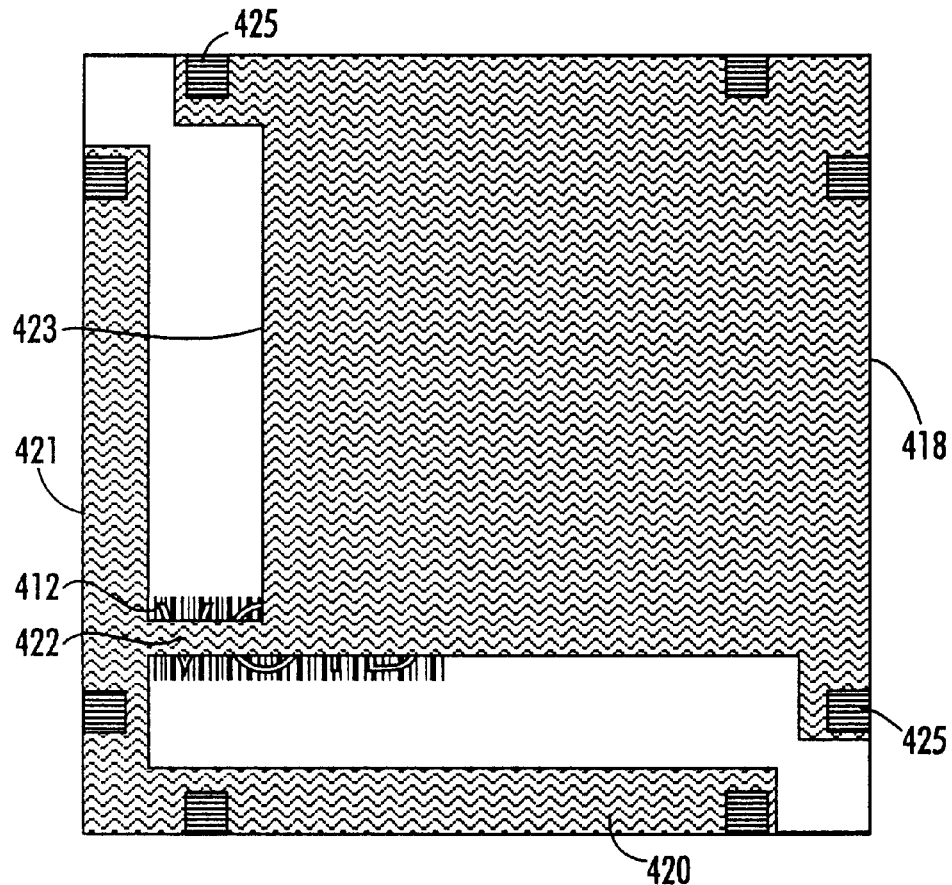
Figure 4:
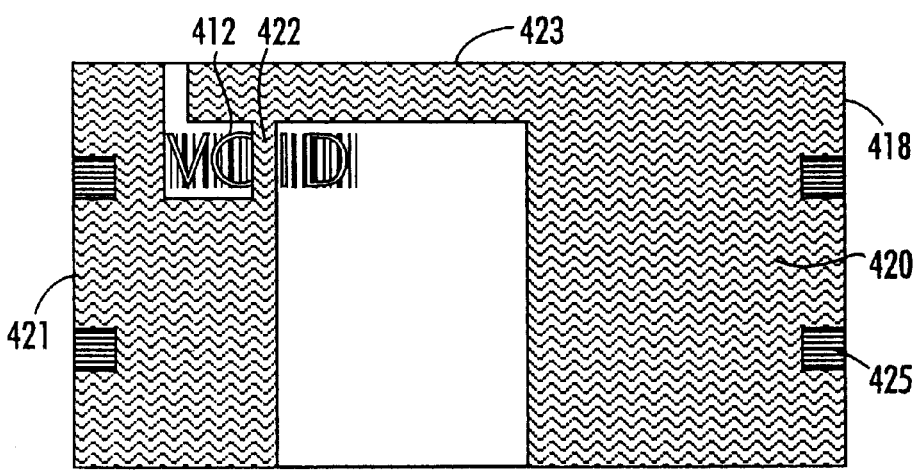
Figures 4, 5:
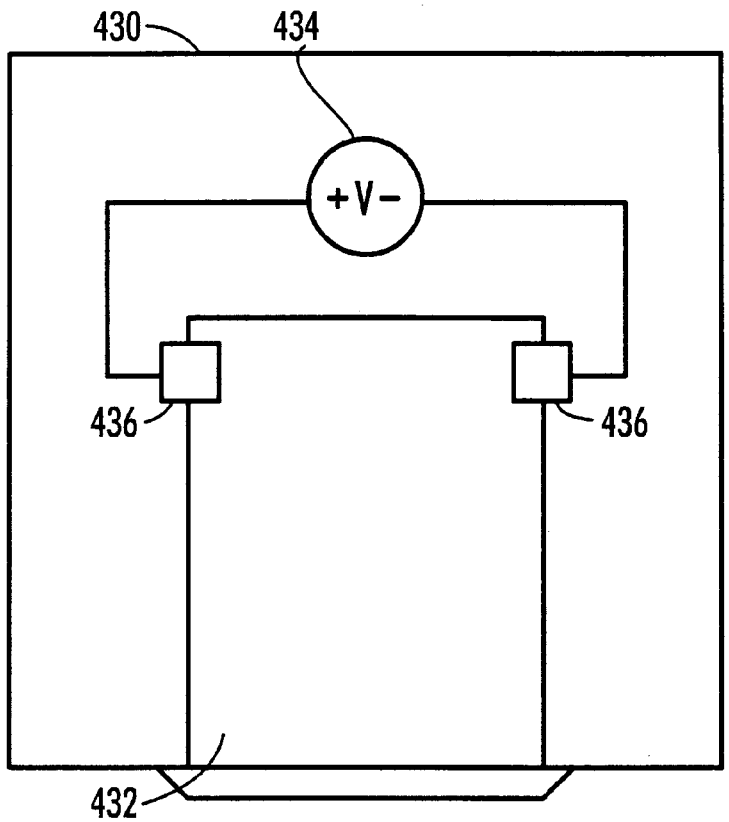
Figures 4, 5, 6:
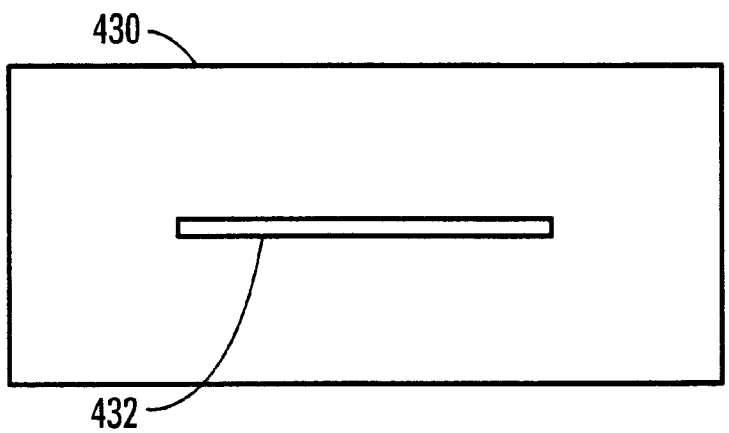
Figures 1, 5:
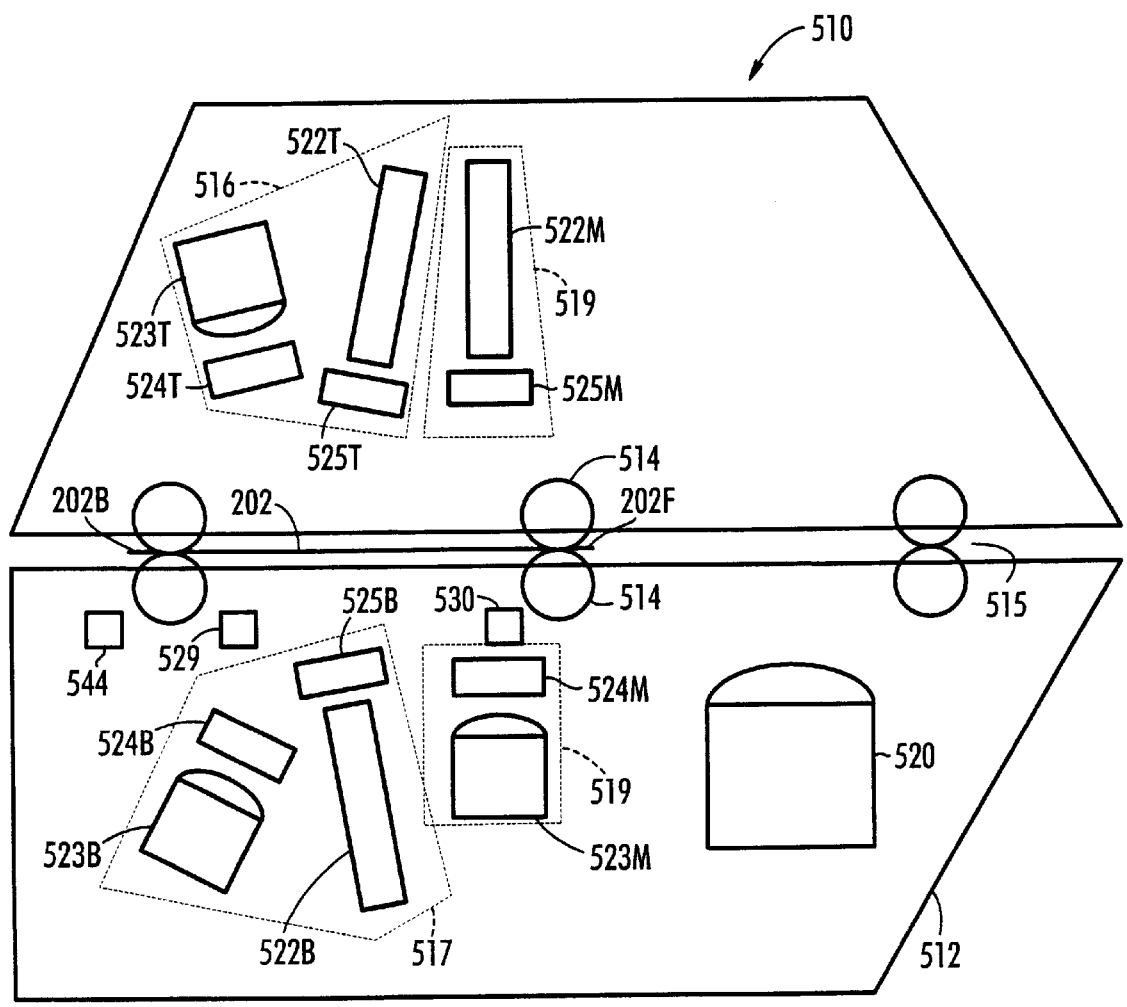
Figures 2, 5:
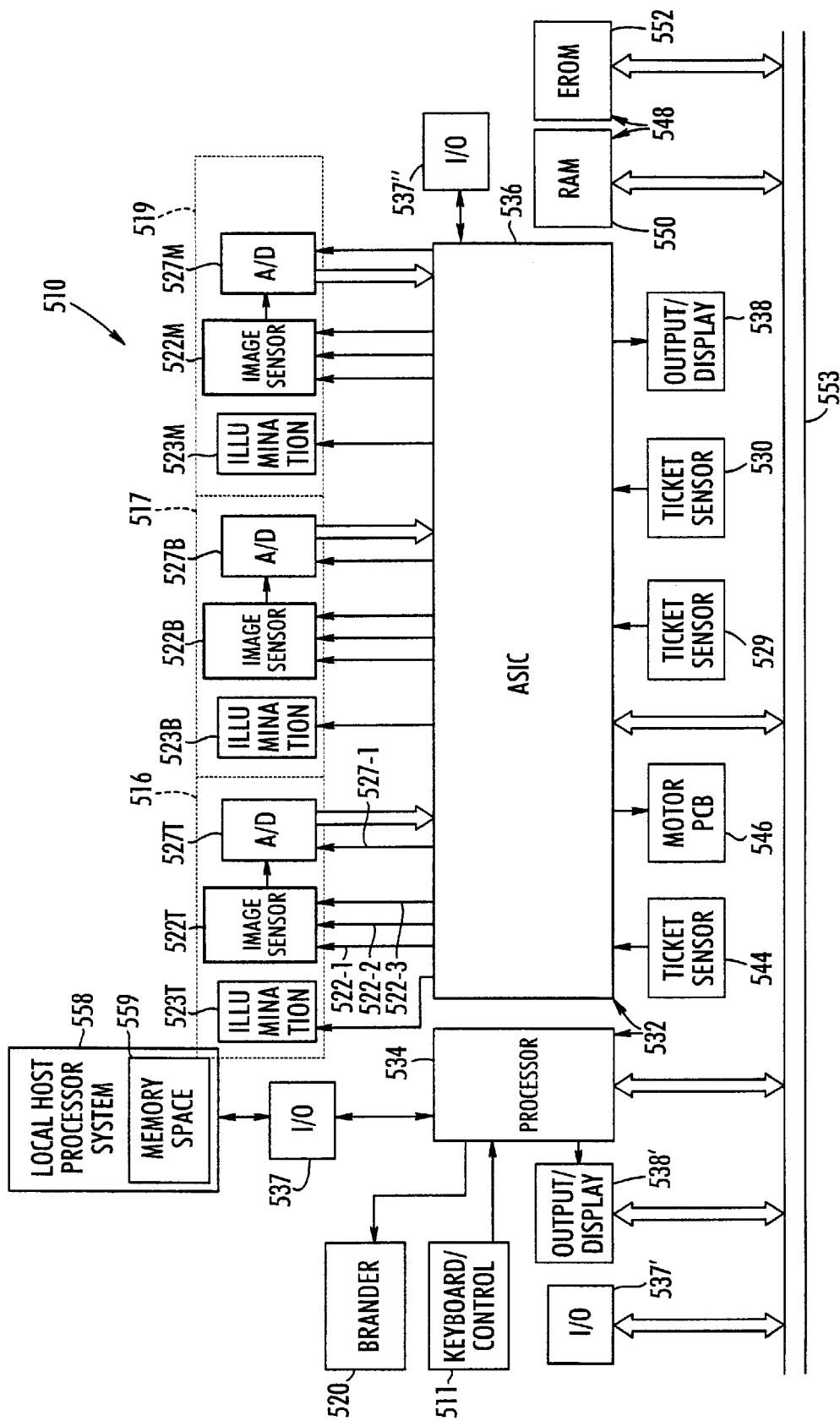
Figures 3, 5:
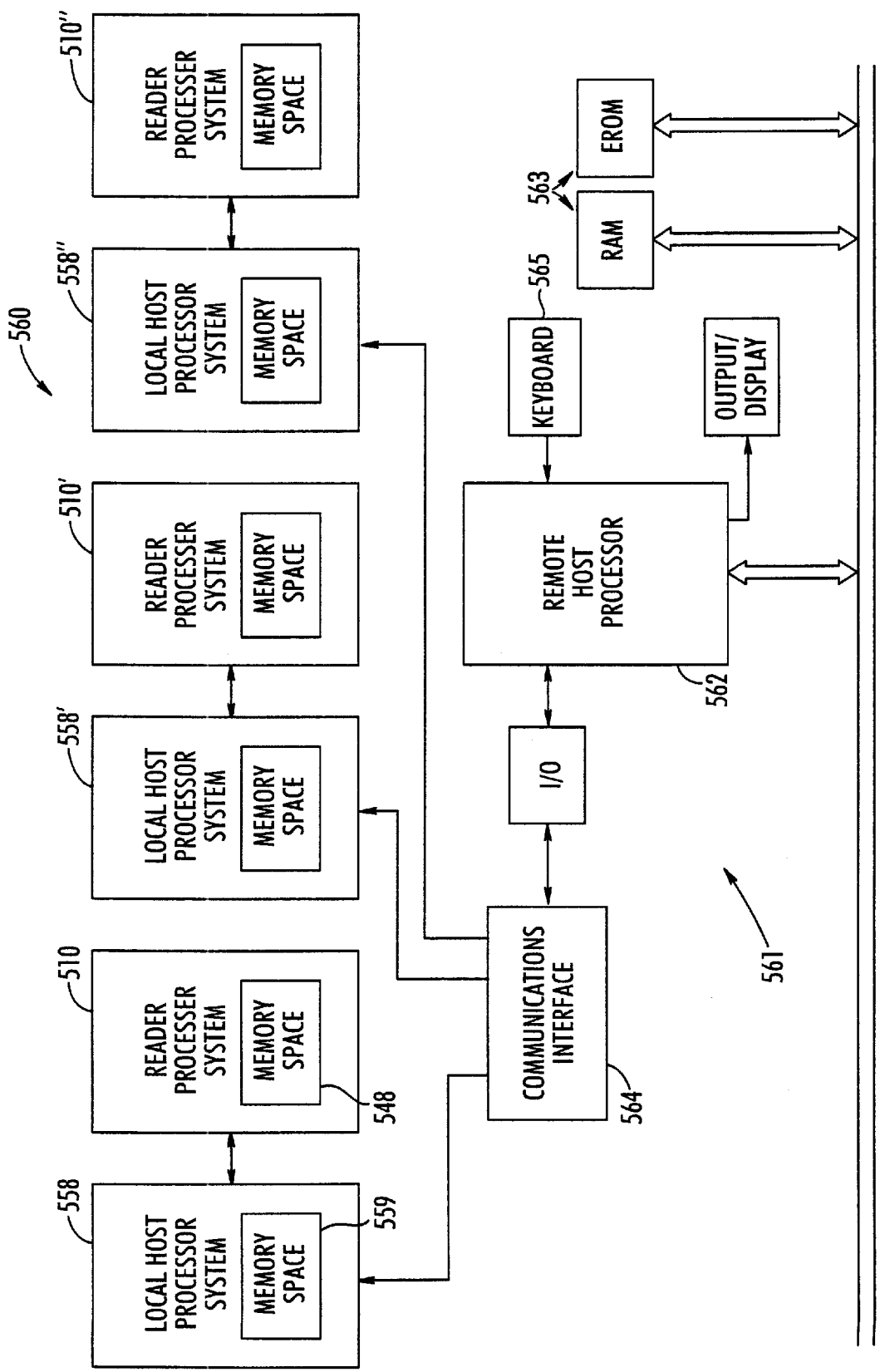
Figures 4, 5:
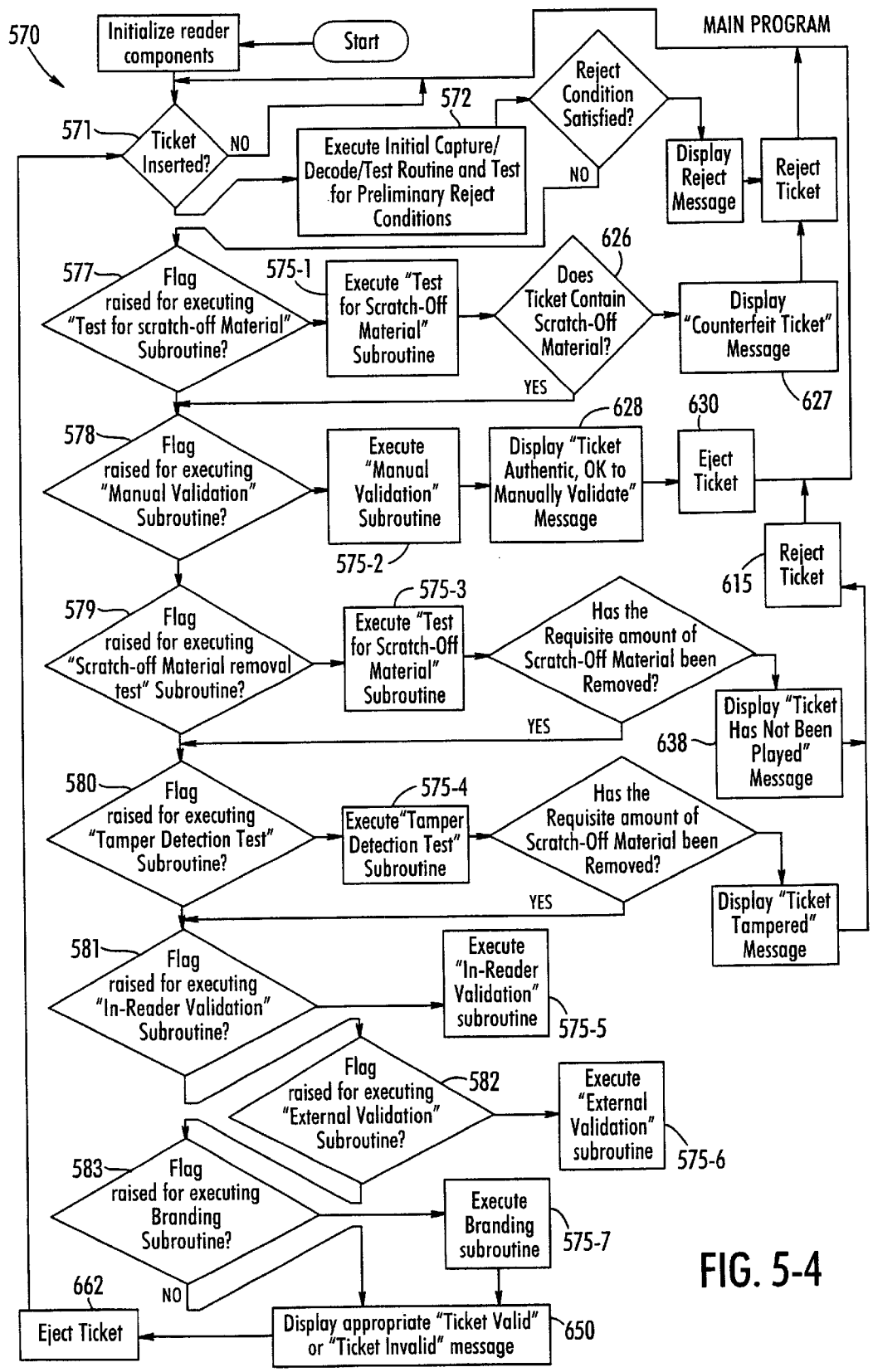
Figures 5, 6:
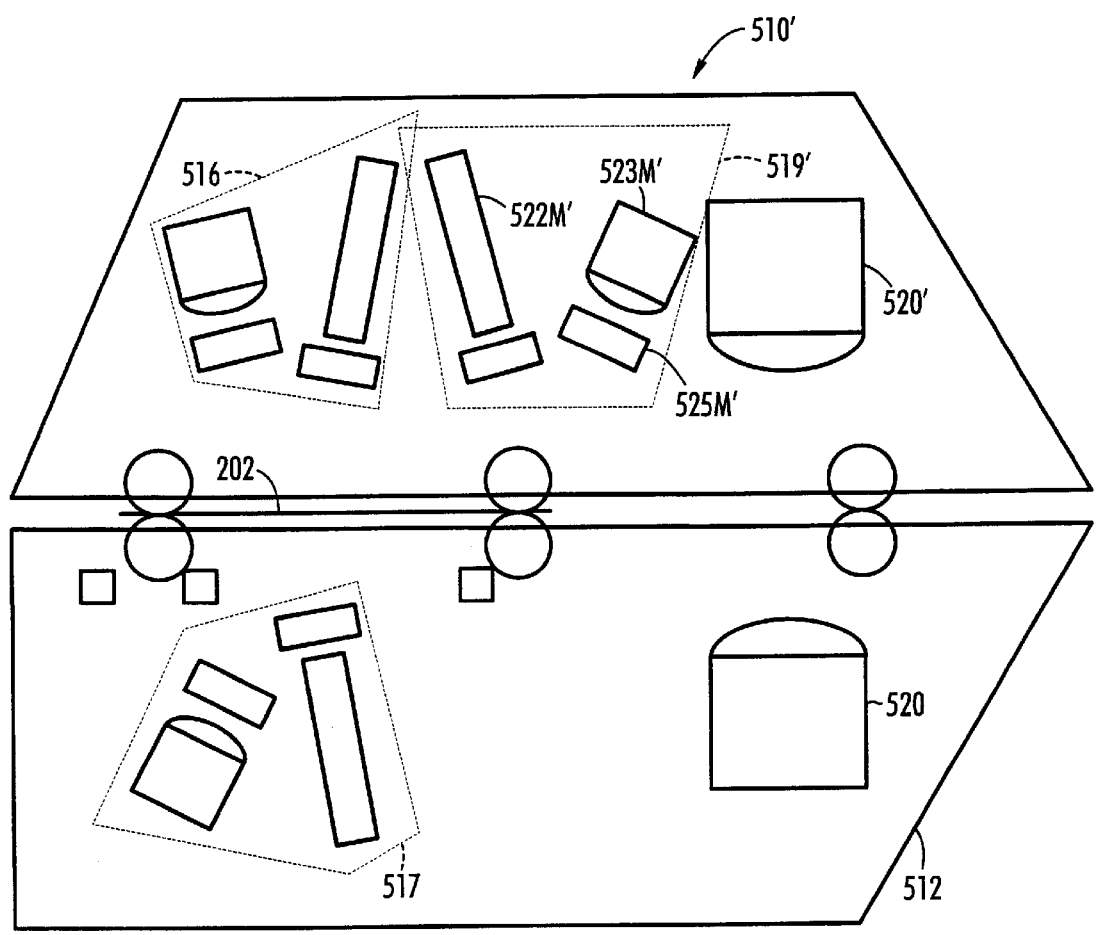
Figures 5, 6, 7:
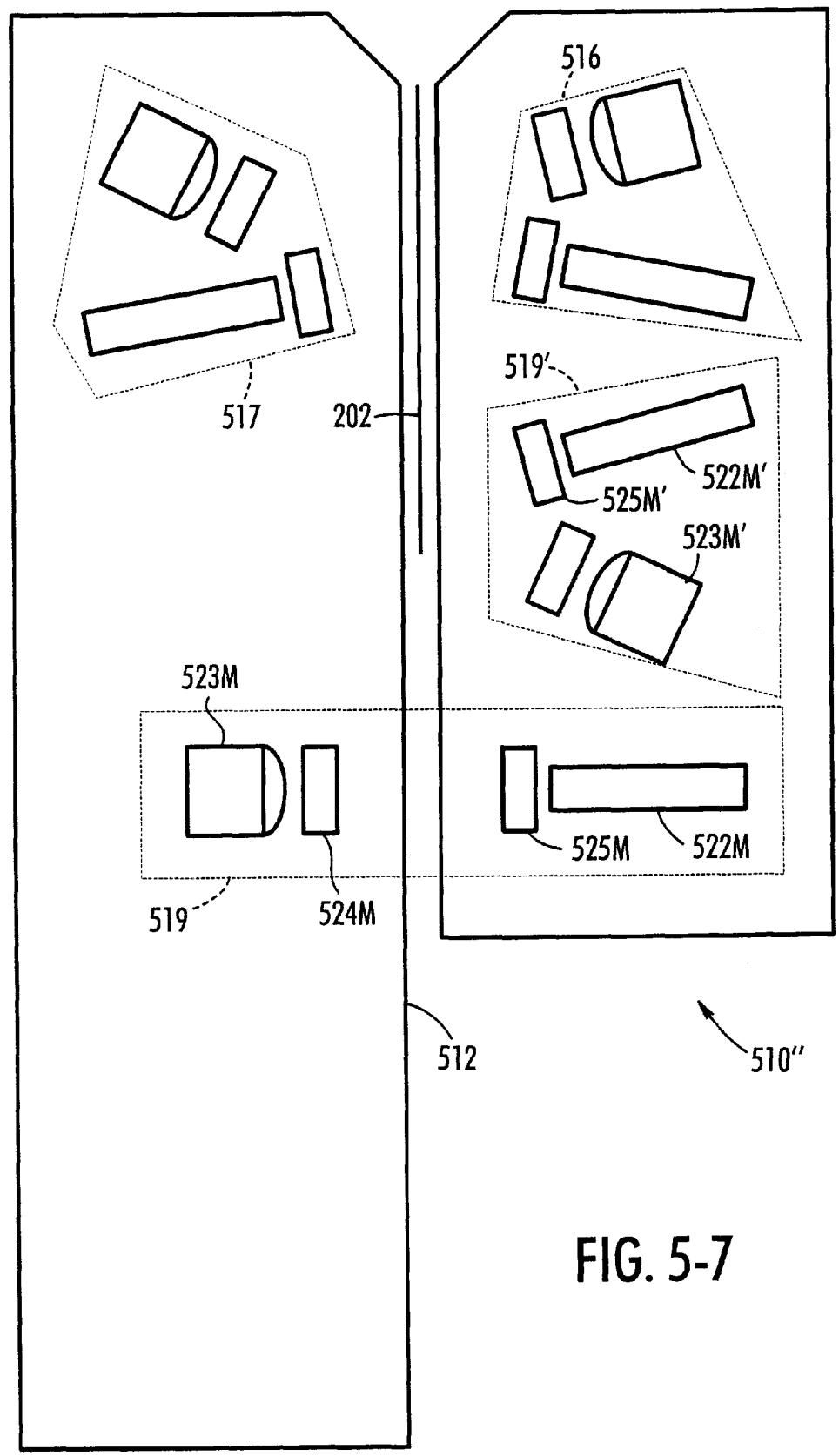
Figures 1, 6:
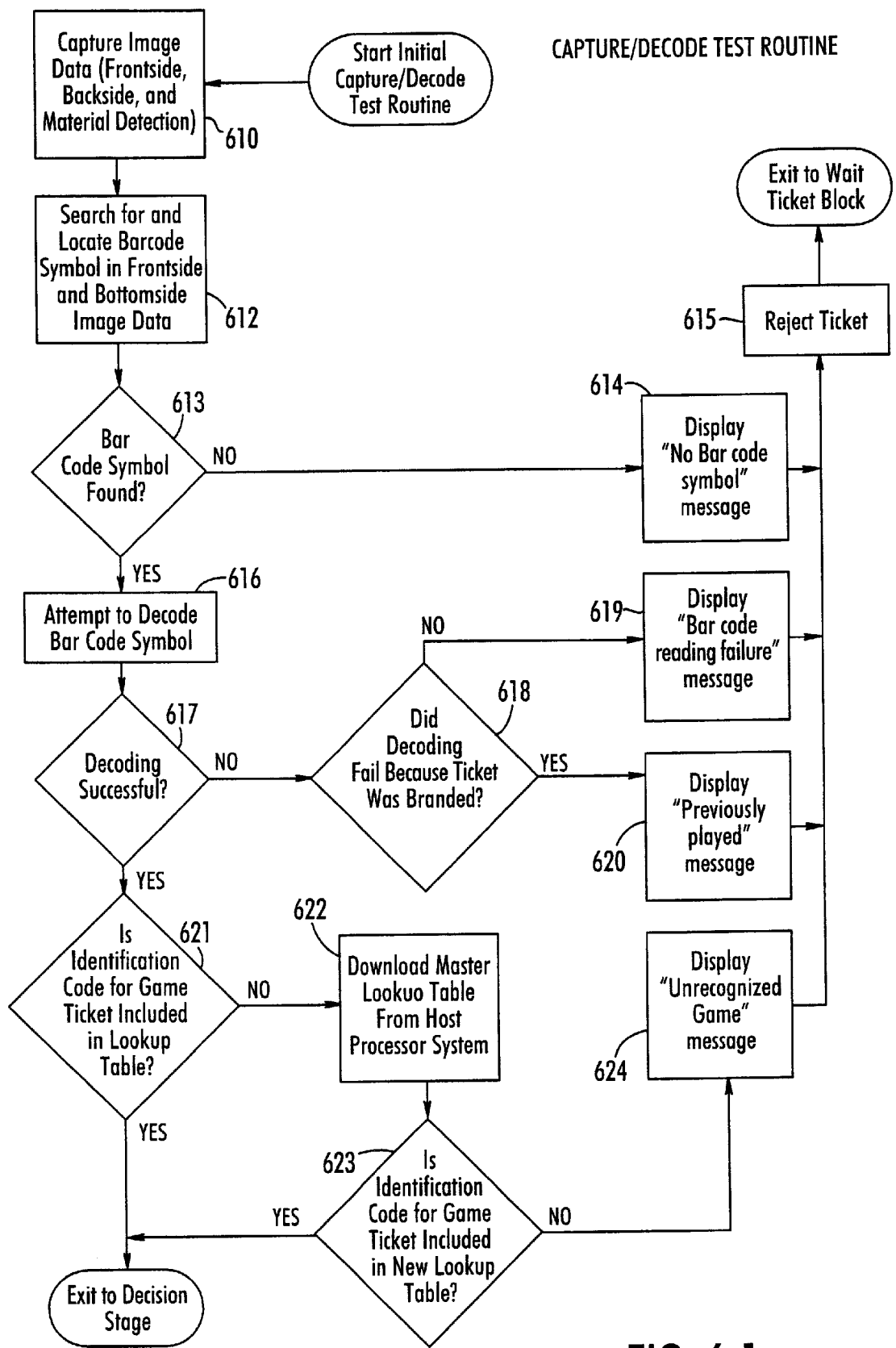
Figures 2, 6:
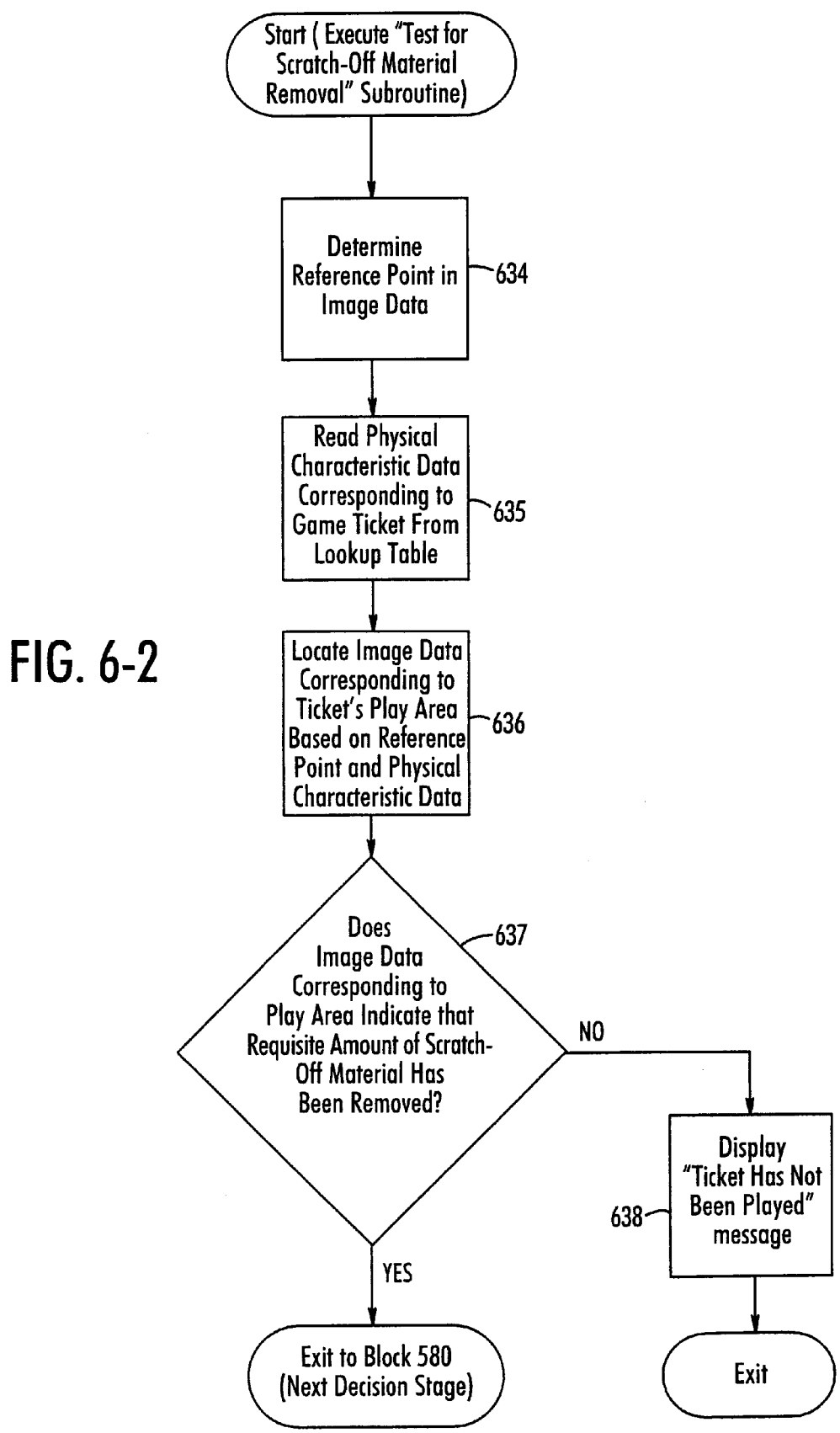
Figures 3, 6:
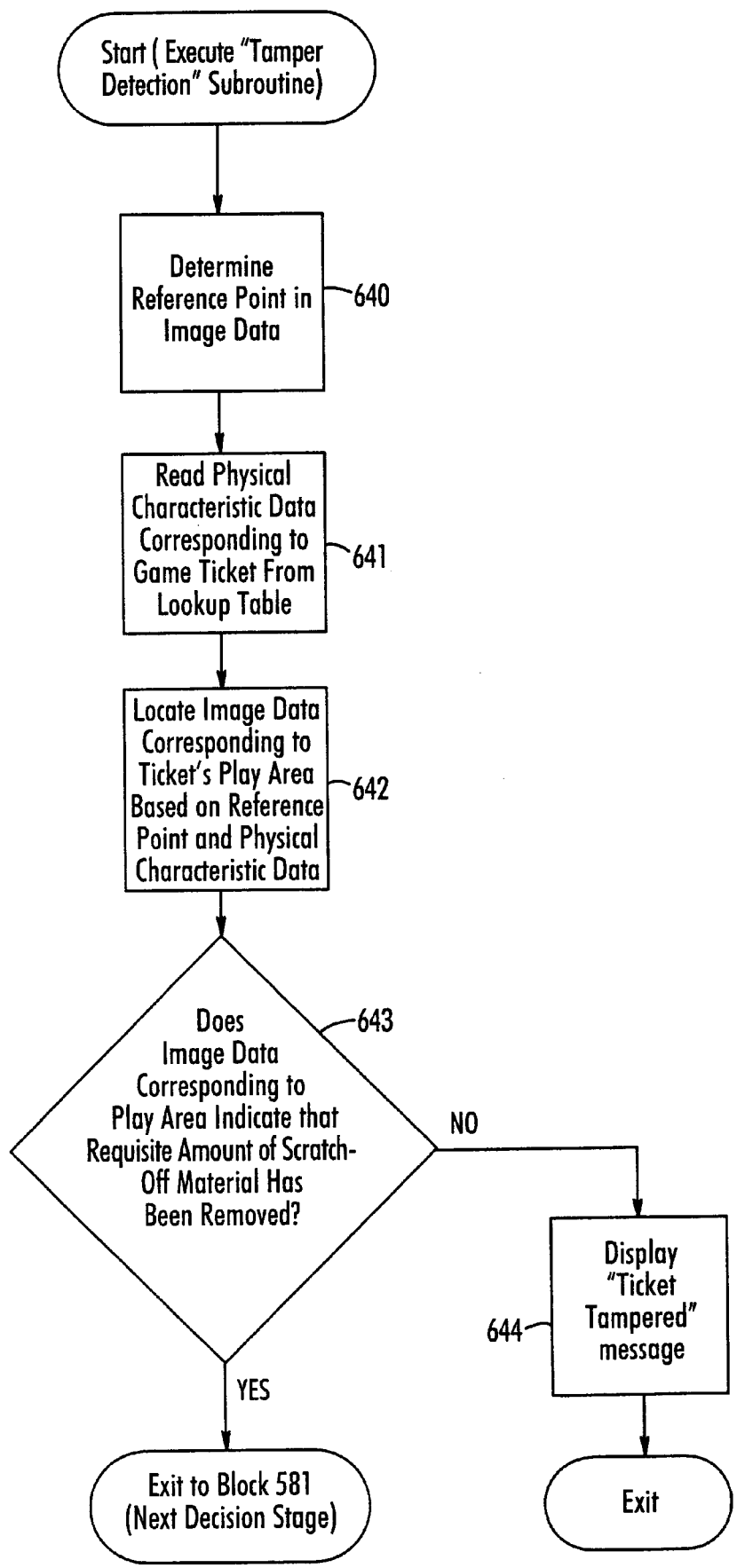
Figures 4, 6:
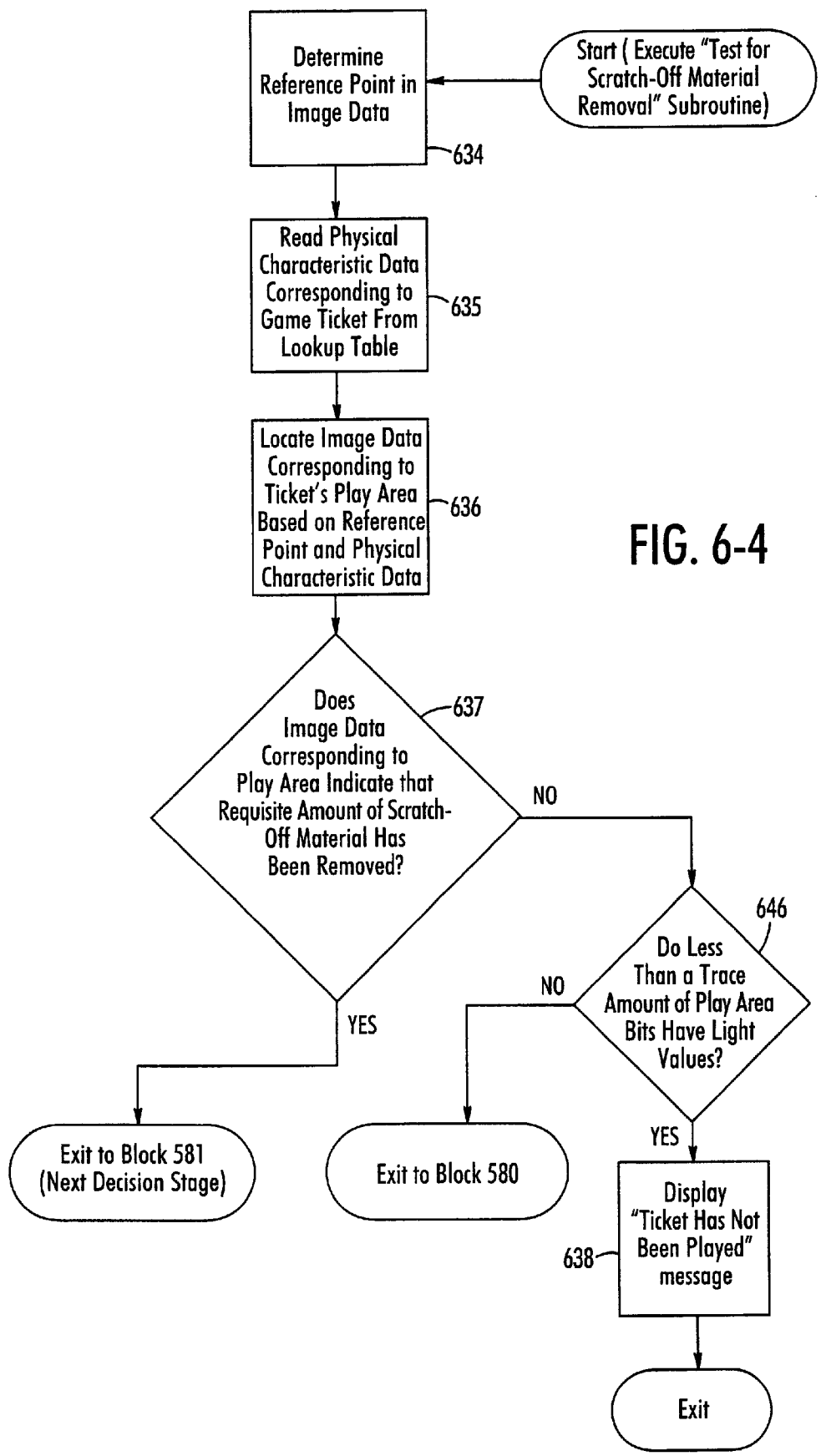
Figures 5, 6:
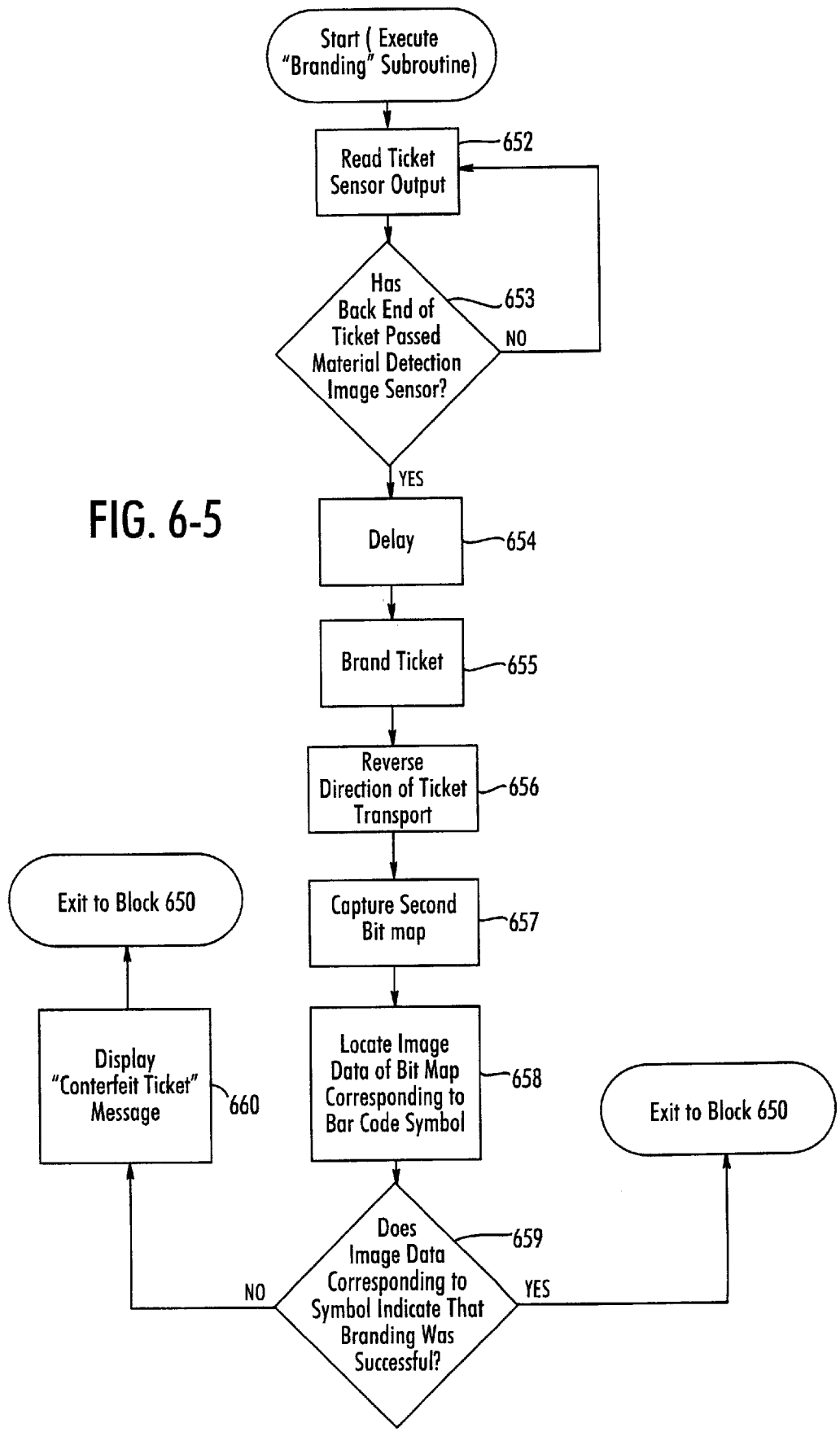

Functional schematic diagrams of alternative embodiment of a document processing apparatus are shown in FIGS. 5-6 and 5-7. In the embodiment of FIG. 5-6 apparatus includes an additive-based material detection system 519' described with reference to FIG. 3-4. In this embodiment, material detection assembly includes a specially adapted illumination source 523M' selected to emit light in a band of wavelengths necessary to excite the light-sensitive additive material added to scratch-off material, and receive optics 525M' of assembly 519' includes an optical filter for filtering out light not with the band of wavelengths at which the additive of the document emits when exposed by light emanating from source 523M'. Preferably, material detection image sensor 522M' is disposed in relation to document so as to be exposed to light rays emanating from illumination source and reflected from document 202. The apparatus of FIG. 5-6 further includes a topside brander energy source 520' for branding a topside of a game ticket 202.

The embodiment of FIG. 5-7 includes two types of material detection assemblies incorporated in a single document processing apparatus. First material detection imaging assembly 519 is configured to detect the presence of scratch-off material on a game ticket based on transmissivity characteristics of a game ticket while second material detection imaging assembly 519' is configured to detect the presence of scratch-off material by detecting for the presence of a light-sensitive additive which has been previously incorporated in the scratch-off material of a game ticket as has been described previously herein in Section III. Alternatively, the detection imaging assembly 519' can be configured to detect the absence of scratch-off material by detecting for the presence of a light-sensitive additive which has been previously incorporated beneath the scratch-off material of a game ticket.

Receive optics 525M of first material imaging assembly 519 includes an optical filter for filtering out light not with the band of wavelengths emanating from illumination source 523M while receive optics 525M of second material detection imaging assembly 519' includes an optical filter for filtering out light not within the band of wavelength reflected from document originating from illumination source 523M. Providing first and second material detection imaging assemblies 519 and 519' enhances the accuracy with which apparatus 510" can determine whether a security document is authentic (whether it has been manufactured according to authorized specification) and whether a security document is valid (whether it satisfied the requirements of being a winning ticket).

For example, apparatus 510" can be made to make a first determination as to whether a document is authentic based on whether image signals (indicative of transmissivity characteristics of document) generated by image sensor 522M satisfy a certain criteria, and a second redundant determination as to whether a document is valid based on whether image signals from image sensor 522M' indicate that a predetermined additive is present in a game ticket.

Apparatuses 510, 510' and 510" may have scratch-off material detection systems incorporated therein designed in accordance with system 340 described with reference to FIG. 3-6. If a reading apparatus according to the invention includes a controlled reflectance system 340, then, in general controller 532 (FIG. 5-2) is made to analyze image data captured from topside image sensor 522T in order to detect the presence of scratch-off material in a game ticket. Because illumination source 523T of topside imaging assembly 516 is normally provided by a narrow band red light source, a reader equipped to determine the presence of scratch-off material on a game ticket based on reflectance characteristic of a play area will not require an additional narrow band light source if the colors of a play area of tickets to be processed are controlled according to their reflectance characteristics under red light. Reader 510 will normally require an additional narrow band illumination source or sources, however, if it is equipped in accordance with a controlled reflectance material detection system requiring more than one narrow band light source or a narrow band light source other than a red light source.

A block electrical diagram of the invention is shown in FIG. 5-2. Lottery ticket reader 510 includes a controller 532, typically provided by one or more processors 534 and 536. Preferably, controller 532 comprises an integrated circuit microprocessor 534 and an application specific integrated circuit or ASIC 536. Processor 534 and ASIC 536 are both programmable control devices which are able to receive, output and process data in accordance with a stored program stored in a memory space 548 comprising either or both of a read/write random access memory or RAM 550 and an erasable read only memory or EROM 552. Processor 534 and ASIC 536 are also both connected to a common bus 553 through which program data and working data, including address data, may be received and transmitted in either direction to any circuitry that is also connected thereto. Processor 534 and ASIC 536 differ from one another in their operation.

The actual division of labor between processors 534 and 536 will depend on the type of off-the-shelf microprocessors that are available, the type of image sensors which are used, the rate at which image data is output by the imaging assemblies 516, 517, and 519. There is nothing in principle, however, that requires that any particular division of labor be made between processors 534 and 536, or even that such a division be made at all. This is because special purpose processor 536 may be eliminated entirely if general purpose processor 534 is fast enough and powerful enough to perform all of the functions contemplated by the present invention. It will, therefore, be understood that neither the number of processors used, nor the division of labor therebetween, is of any fundamental significance for purposes of the present invention.

With processor architectures of the type shown in FIG. 5-2, a typical division of labor between processors 534 and 536 will be as follows. Processor 534 is preferably devoted primarily to the tasks of decoding image data, once such data has been stored in RAM 550, transmission and reception of data to and from a processor external to reader 510 through an RS 232 or RS 485 (or other) compatible I/O device 537, and providing overall system level coordination.

Processor 536 is preferably devoted primarily to controlling the image acquisition process, the A/D conversion process and the storage of image data, including the ability to access memories 550 and 552 via a DMA channel. Processor 536 may also perform many timing and communication operations. Processor 536 may, for example, control the illumination of LEDs 523T, 523B, and 523M, the timing (exposure start time, exposure stop time, the clock out time) of image sensors 522T, 522B, and 522M (see FIG. 5-1), the timing of analog-to-digital (A/D) converters 527T, 527B, and 527M, the coordination between a transport motor and image sensors 522T, 522B and 522M, and the outputting of user perceptible data via an output device 538, which may comprise a display device, such as a liquid crystal display, CRT, an array of LED's and or sound producing displays such as speakers or beepers. It is seen from the functional diagrams 5-1, 5-6, and 5-7 that controller 532 at certain times during the processing of a security document will be required to construct bit maps from image signals received from each of the three image sensors concurrently. Processor 536 is conveniently employed to arbitrate bus 553 so that binarized image signals from each image sensor are written into the appropriate bit map storage location address location of RAM 550. Control of output, display and I/O functions may also be shared or duplicated between processors 534 and 536, as suggested by bus driver I/O and output/display devices 537' and 538'. As explained earlier, the specifics of this division of labor is of no significance to the present invention.

In the case where image sensors 522T, 522B, 522M are 1×N linear array type image sensors, three inputs are typically provided from processor for the control of each image sensor. Referring to topside imaging assembly 516, first input 522-1 carries a signal causing image sensor to begin an exposure period, a second input 522-2 carries a signal causing image sensor 522T to end an exposure period, and third input 522-3 carries a signal causing an image signal waveform corresponding to a row of pixels to be clocked or read out of image sensor and presented to analog-to-digital converter 527T. An A/D input 527-1 carries an A/D control signal which causes the analog waveform image signals presented to A/D converter 527T to be sampled at the appropriate times to assure that digital image signals corresponding to each pixel of the array are presented to processor 536.

One specific practical example of a document reader of the type shown in FIG. 5-2 may be constructed using the particular commercially available solid-state integrated circuits listed in the following component table:

COMPONENT TABLE

| Block Diagram Item | Manufacturer and Part No. |
| --- | --- |
| Processor 534 | Motorola HC11 |
| Image Sensor 522T | Toshiba TCD 1503 |
| Image Sensor 522B | Toshiba TCD 1503 |
| Image Sensor 522M | Toshiba TCD 1001 |
| RAM 550 | Sony CXK 5864-BM-10LL |
| ROM 522 | ATMEL AT 29C257 |

As indicated by block diagram 5-2, reader 510 is preferably in communication via I/O device with a local host processor system 558 which includes a local host processor memory space 559. Local host processor system 558 is typically located in proximity with reader at a game ticket processing location, such as a convenience store.

As illustrated in FIG. 5-3, reader 510 and local host processor system 558 are preferably part of a larger communications system 560 comprising a main remote processor system 561 including a main remote processor and a main remote processor system memory space 563, which is in communication with a plurality of local host processor systems, e.g. 558', and processor system 558 also shown in FIG. 5-2. Main remote processor system 561 may communicate with a local host processor system via communication interface device 564 such as a modem, or via another suitable communications link, for example via a computer network connection. Wireless communication links, such as RF links or other wireless links may be provided between main remote processor system 561 and local processor system 558.

Main remote processor system 561 is typically operated under the control of local, state, or national government agency, and is typically equipped with data input devices such as a keyboard 565 and a disk drive which enable data and programs stored in memory space 563 to readily be edited and updated. Main remote processor system 563 could also be in communication with a remote governing processor system (not shown) which is in communication with each of several main remote processor systems similar to system 561.

Communications system 560 provides two major functions for the purposes of the present invention which will be explained fully herein. First, communications system makes available to reader 510 new validating algorithms. In determining whether a game ticket is a winner, reader 510 applies a validating algorithm to the identification code of a game ticket. The features of the validating algorithm are kept secret and updated periodically so that the win/loss status of the ticket cannot be determined except by application of the present validating algorithm. A second major function of the communication system is to make game data available to reader 510. As will be seen herein, game data, typically provided in the form of a lookup table, correlates identification code information with game ticket physical characteristic data, and with main program flag status indicators so that processing of a game ticket received in the reader is made dependent on the identification code of the ticket being processed. As new styles of games are manufactured and as new tickets are produced, the game data must be updated to include the new game styles and game tickets. Distributing new game data to each of several local processors is conveniently accomplished by updating the data in a main remote processor system 561 then writing the new data to each of several local processor systems 558, 558', and 558".

Referring again to aspects of reader 510, a high level flow diagram illustrating operation of a main program for controlling the overall operation of reader 510 is illustrated in the flow diagram FIG. 5-4. According to main program 570, the controller 532, after positively sensing a ticket via sensor 544 at block 571, executes an initial read/decode routine at block 572 and then executes at least one of several processing subroutines. In general, a similar initial image capture subroutine will be followed for each document that is presented to reader 510. In an initial image capture/decode subroutine, controller 532 captures image data representing the front and back of a game ticket 202 searches for identification bar codes represented in that image data, and decodes any bar codes existing in that image data. For most lottery game tickets, decoding a bar code symbol formed on a game ticket reveals a game ticket identification code.

Processing subroutines which controller 532 may execute after executing an initial capture/read/decode subroutine include an authentication subroutine, a manual validation subroutine, a scratch-off material removal test subroutine, a tamper detection subroutine, and a branding subroutine. Which of the potential subroutines controller 532 executes depends on the status of control flags which controller 532 polls at various stages of operation of main program 510. In the example shown, controller 532 polls the status of control flags at decision blocks 577, 578, 579, 580, 581, 582, and 583 to determine which of the potential subroutines reader 510 will execute.

Reader 510 may be configured so that the processing subroutines which are executed by reader 510 can be controlled manually. In the case that reader 510 can manually control which processing subroutines will be executed, then controller 532 at decision blocks 577, 578, 579, 580, 581, 582 and 583, polls a flag that is raised or lowered by manual input commands input to controller 532 by an operator with use of a keyboard or control buttons 511 which may be integrated into housing 512. When polling the status of a flag raised manually, controller 532 polls the contents of an address corresponding to the keyboard or control buttons operated to manually raise the flag status indicators.

In addition to or in place of the manual control of which subroutines controller 532 executes, reader 510 may be configured so the processing subroutines which controller executes are dependent on the style of game ticket presently being processed.

To the end that execution of the various processing subroutines 575l-1 to 575-6 is made dependent on the style of ticket being processed, then a lookup table which correlates an identification code of a given game ticket 202 with various control flag indicators pertaining to that code is stored into memory space 548 of reader 510. A lookup table 590 which may be stored in memory space 548 is shown in FIG. 5-5. Lookup table 590 includes a first column 591 listing game ticket identification code (for a portion of an identification code), and at least one control flag status indicator column 592 indicting the status of a flag which determines whether or not controller 532 will execute a particular potential subroutine. When executing one of the decision blocks 577, 578, 579, 580, 581, 582, and 583, then controller 532 will poll the column and row of data in lookup table 590 corresponding to the identification code of the ticket 202 presently being read in order to determine whether controller 532 will execute a potential processing subroutine. In some cases, the controller will use data that has been read from the ticket and combined with the data from the lookup table 590 to fully describe the relevant attributes of the game, the instance of the game on the ticket, and the particular processing required for that ticket. This correlation of information can be used on both sides of the ticket, or include data read from a ticket's light-sensitive material layer.

It is seen further from FIG. 5-5 that lookup table 590 includes at least one column 593 including data pertaining to the physical characteristics of the ticket being processed. Such physical characteristic information may include, for example, the dimensions of the ticket, and the dimensions and the location of the play areas (and scratch-off material) of the game ticket. Such information is useful in several of the ticket processing applications of the application. Physical characteristic game data defining the location of a play area, e.g. column 593 data, are typically provided in the form of distance parameters which define a point location (such a center point or corner point) with respect to a predetermined reference point of a game ticket. The predetermined reference point of the ticket may be defined by, e.g., corner points of the game ticket, an identification bar code symbol of a game ticket, or another indicia of a game ticket added to the ticket for purpose of providing a reference point.

For example, in a latex detection function according to the invention, which will be explained in detail herein, controller 532 determines whether scratch-off material covering a play area of a ticket has been scratched. In making such a determination, controller reads from lookup table the positions and locations of the play areas in a game ticket in order to determine the appropriate image data pertaining to those positions.

Lookup table 590 can include one entry or row of data corresponding to each individual ticket, as identified by its identification code. For many applications, however, it is sufficient to provide one entry for each style of ticket, and to process each ticket manufactured according to a given style in the same way. Where it is sufficient to provide one entry per style of ticket, controller 532 can be made to data from lookup table 590, by reading certain characters of an identification code pertaining to a ticket style, and ignoring certain other characters of an identification code not pertaining to a ticket style.

VI. Document Reader Operation

The various functions which reader 510 may be adapted to perform will now be described in detail. In operation, reader 510 is configured to carry out an initial capture/decode/test routine, and then execute at least one of several potential processing subroutines whose execution depends on the status of various flags controlling the operation of these functions or subroutines.

A flow diagram illustrating the steps in the operation of an initial capture/decode/test routine which is carried out in the same manner for each game ticket presented to reader is described with reference to the flow diagram of FIG. 6-1. In executing the operation, routine controller 532 captures the necessary image data that will be required to carry out the various potential functions of the reader.

Briefly, referring to FIGS. 5-1 and 5-2, reader 510 captures image data as follows. When a ticket 202 is sensed by position sensor 544, controller 532 issues the appropriate command to motor PC Board 546 to actuate transport mechanism 514 so that transport mechanism 514 transports game ticket 202 across the field of view of image sensors 522T, 522B, and 522M. In the specific embodiment of FIG. 5-1, transport mechanism 514 transports a front end 202T of game ticket 202 across the field of view of topside and bottomside image sensors 522T, 522B before transporting ticket 513 across the field of view of material detection image sensor 522M.

Controller 532 is configured to construct bit map representations of indicia patterns on the topside and bottomside of a game ticket by capturing successive "slices" of image data corresponding to a line of indicia on a game ticket that runs the width of a game ticket. Each image sensor 522T, 522B and 522M is adapted to develop analog signal waveforms that represent, at any give time, a complete line or slice of a game ticket surface, which is presently in the field of view of the image sensor. Controller 532 captures a slice of image data, in general, by issuing appropriately timed control signals to image sensors 522T, 522B, and 522M and to appropriately timed A/D converters 527T, 527B, and 527M (FIG. 5-2) and by reading into memory space 548 at the appropriate read rate, bits or bytes of data corresponding to image signal waveforms output by sensors 522T, 522B, and 522M representing a complete line of ticket indicia. If the value of each pixel in an image sensor pixel array is to be captured by controller 532 as a binary 1 bit number then the output from an A/D converter 527T will be either a 1 or 0. If the value of each pixel is to be captured as a grey scale value then the output of A/D converter 527 is a multi bit signal representing the grey scale of each pixel. Image sensors 522T, 522B, and 522M are adapted to generate image signals corresponding to the full width of a game ticket having a maximum available width. Thus, for game tickets having less than the maximal width, additional image data corresponding to an image signal that does not represent a part of a ticket will be captured.

The output signals generated by ticket position sensors 529 and 530, along with the transport speed with which a ticket is transported determine the time at which controller 532 commences capturing image data corresponding to a given image sensor, and the time at which controller ceases capturing image data corresponding to a given image sensor.

The "sample rate" is the rate at which controller 532 captures slices of image data from the image sensors 522T, 522B and 522M. The sample rate and pixel dimension of image sensors 522T, 522B and 522M should be selected according to the resolution requirement of the image data that is captured. Image sensors 522T, 522B will be required to generate image signals for use in capturing image data containing therein fine lined bar code symbols, as fine as 6 mils, while the resolution requirements of image data captures from material detection image sensor 522M will normally be less.

So that sufficiently high resolution and sufficiently distortion-free image data are captured, the speed of transport mechanism should be coordinated with the sampling rate. In one practical working example of the invention, the transport speed, required resolution, the pixel dimension, and sampling rate associated with the various image sensor are as follows:

| Image Sensor | Transport Speed | Resolution | Pixel Dimension | Sample Rate |
|---|---|---|---|---|
| Topside 522T | 15 I/sec. | 330 dpi | 5000 pixels, 1400 pixels used | 4,950 sample/sec. |
| Bottomside 522B | 15 I/sec. | 330 dpi | 5000 pixels, 1400 pixels used | 4,950 sample/sec. |
| Mat. Det. 522M | 15 I/sec. | 30 dpi | 128 pixels | 450 sample/sec. |

Controller 532 assembles slices of image data corresponding to image signals generated by a given image sensor 522T, 522B, or 522M in predetermined (normally sequentially addressed) address locations of memory space 548 to form initial bit map image representations of a complete topside surface (by topside 522T and material detection 522M image sensor) or bottomside surface (by bottomside 522B image sensor) of a game ticket 202. The initial bit map representations captured from image signals generated by topside image sensor 522T and bottomside image sensor 522B shall be referred to herein, respectively, as the topside and bottomside bit maps while the bit map representation constructed from material detection image sensor 522M shall be referred to herein as the material detection bit map.

Turning again to FIG. 6-1, when the initial bit maps are completely constructed at block 610 (at the time when the back end 202B of a game ticket passes position sensor 522M then controller 532 proceeds to block 612, in order to search for and attempt to decode any bar code symbols which may be included in the captured image data. In searching for and decoding any bar code symbols which may be included in the captured image data, controller 532 will search through the topside and bottomside bit maps for bar code symbols.

The searching for and decoding of bar code symbols in the captured image data can be carried out in accordance with use of one of several search and decode methodologies that are in widespread use in the art, and available from a variety of different software providers including Welch Allyn Corporation of Skaneateles Falls, N.Y. In general, these symbol finding methodologies involve analyzing a row or column of a bit map to determine if the row or column includes a sequence of dark pixels followed by a sequence of light pixels according to a predetermined criteria, then, if a grouping satisfying the pattern criteria is found, pixels surrounding the grouping are analyzed until a determination is made as to whether the image data includes a symbol.

As described in Section II herein, lottery game tickets 202 of the type reader 510 is configured to process have printed thereon an identification code bar code symbol 208 which encodes an identification code pertaining to that particular ticket.

However, as seen in FIG. 2-1 lottery game tickets often have more than one bar code symbol printed thereon. For example, lottery game tickets often have a sales data bar code symbol 209 printed thereon in addition to having an identification code bar code symbol 208. Fortunately, recognizing a located bar code symbol as a sales data bar code symbol is normally an easy task considering that sales data bar code symbols are commonly printed in one symbology, UPS symbology, which is employed on a widespread basis for the purpose of encoding sales records information. Therefore, after locating a bar code symbol in captured image data at block 613, controller 532 determines if the located symbol satisfies a predetermined criteria for being an identification code type bar code symbol. Such criteria may be for example, that the symbol is not a UPS-symbol, or is of a symbology designated for possible use as an identification code symbol. If the located symbol does not satisfy the criteria for being an identification code bar code symbol, then controller 532 at block 613 continues to search for bar code symbols in the captured image data. If a located symbol does satisfy the criteria for being an identification code type bar code symbol then controller 532 proceeds to block 616 and attempts to decode the symbol. If no symbol is found that satisfies the requirements of being an identification code type symbol, then controller 532 at block 614 displays a "No Bar Code Symbol Found" message and proceeds to reject the game ticket at block 615.

Display messages described herein may be displayed by a display device which has been incorporated in reader 510 (not shown). Preferably, however, controller 532 is configured so that when controller 532 causes the display of a message, controller 532 writes a message to I/O device 537 which is received by local host processor system 558 which displays the message on a display device incorporated therein.

"Rejecting" the game ticket shall be referred to herein as the process of transporting a ticket 202 through reader 510 to the outlet thereof subsequent to capturing image data pertaining to the ticket without performing any further processing of the ticket involving, e.g., branding or validating.

If controller 532 does locate at block 613 a bar code symbol in the image data satisfying a criteria for being an identification code bar code symbol, controller 532 proceeds to block 616 and attempts to decode the located bar code symbol. If the controller 532 at block 617 determines that the located symbol cannot be decoded then controller proceeds to block 618, and attempts to determine whether the symbol cannot be decoded because it has been previously branded. If the ticket has been previously branded, then its win/loss status has been previously processed by reader 510 and it should not be processed again. The attempt to reprocess a ticket which has been previously processed as indicated by the ticket being branded can be an indication of an attempted fraud.

As has been discussed herein, and in detail in Section IV, brandable ink may be formed on a symbol according to a predetermined pattern, which become visible after being branded. It should be noted that the brand does not have to be located on the bar code symbol. Because the pattern of the brandable ink is predetermined, whether or not a ticket has been branded can be determined by application of a pattern recognition algorithm in which controller 532 determines whether the predetermined brand pattern is present in the captured image data corresponding to the location of the identification symbol. This pattern recognition algorithm can be simplified if the manufacturing of game tickets to be processed by controller 532 is controlled so that each ticket includes a substantially identical branding pattern formed in substantially identical locations and orientations in relation to symbol 208. By application of a pattern recognition algorithm controller 532 determines whether the reason that the symbol cannot be decoded is that the symbol has been branded.

If controller 532 at block 618 determines that the ticket has been previously branded then controller 532 at block 620 causes a "Previously Played" message to be displayed by display 538 and causes the ticket to be rejected at block 615. If controller 532 at block 618 determines that a symbol cannot be read for a reason other than that the ticket has been previously branded then controller 532 causes a general "Bar code reading failure" message to be displayed at block 619 and rejects the ticket at block 615.

If controller 532 successfully decodes the symbol at block 617 then controller 532 proceeds to block 621 to determine if an entry exists in lookup table 590 (as described with reference to FIG. 5-5) corresponding to the identification code of the successfully decoded symbol. At block 621 controller 532 determines if a lookup table entry corresponding to the identification code of the present ticket is resident in reader memory space 548. If an entry is not present in memory 548 then controller 532 proceeds to block 622 to download and then determine at block 623 if an entry corresponding to the identification code of the present ticket is located in a Master lookup table stored in memory space of local host processor system 558.

If a lookup table entry corresponding to the present identification code is not located either in the original lookup table or the download Master lookup table, then controller 532 at block 624 causes to be displayed an "Unrecognized Game" message and proceeds to block 615 to reject the game ticket. If a lookup table entry corresponding to the identification code is present either in the original or Master lookup table, then controller 532 exits the initial capture/decode/test routine and proceeds to execute at least one potential processing subroutine. When an entry corresponding to a present identification code is found, a stack pointer is added to the entry so that the entry is readily located in future processing steps.

As mentioned in Section IV herein, brandable ink formed on a game ticket need not be formed in such a location on a ticket that branding the brandable ink obscures an identification code bar code symbol. Accordingly, if controller 532 successfully decodes a symbol at block 616 controller 532 may execute another processing routine to search, in the captured image data, for sequences of pixel values corresponding to a predetermined brand pattern. Lookup table 590 may have incorporated therein data encoding the location, and possibly characteristics of the brand pattern. If lookup table 590 is made to include data pertaining to characteristics of the brand pattern, then a brand pattern locating routine should be executed after a lookup table entry corresponding to the presented game ticket is found, at block 621 or block 623. In general, brand patterns are formed on game tickets in locations that do not obscure symbols so that the ticket's identification code can be utilized in the processing of the ticket. Thus, if a non-obscuring brand pattern is located, the brand status is recorded and utilized to control further processing of the ticket, but will in general not result in the immediate rejecting of the ticket as is the case where the brand pattern is symbol obscuring brand pattern formed directly on an identification bar code.

With reference to main program flow diagram 570 of FIG. 5-4, controller 532 at decision stage 577 determines if a flag is raised indicating whether a "Test for Scratch-off Material" or "Authentication" subroutine should be executed. This flag will be raised if the designer of the game wishes to have a preliminary test carried out on the ticket to determine if the ticket has authentic scratch-off material printed thereon, before carrying out more sophisticated processing routines involving time and memory consuming character recognition algorithms. Execution of this processing subroutine is particularly useful in the case where the reader includes a material detection system of the type described with reference to FIG. 3-1 and the game ticket includes a scratch-off material having a light-sensitive additive which is selected to emit light in specific wavelength range when illuminated at a certain wavelength range.

If the scratch-off material or the layer beneath the scratch-off material includes a wavelength-responsive additive and the material detection system is of a type that includes a material detection imaging system configured in accordance with the design of FIG. 3-4, then image data captured from material detection image sensor 522M' corresponding to the scratch-off region will indicate whether the game ticket includes the additive. Therefore, the "Test for Scratch-Off Material" subroutine can comprise a simple algorithm which analyzes image data corresponding to the play area to determine whether at least one bit or bits of data corresponding to a single pixel of array 522M' indicates the presence of an additive in the scratch-off material.

Still referring to FIG. 5-4, if controller 532, in execution of a "Test for Scratch-off Material" algorithm, determines at block 626 that the scratch-off material does not include a light-sensitive additive, then controller 532 at block 627 may cause display of a "Counterfeit Ticket" message and proceed to block 615 to reject the ticket.

Additional preliminary checks as to the authenticity of a game ticket can be made in the case reader 510 includes the required reader elements of a controlled reflectance material detection system described with reference to FIG. 3-6, and ticket is manufactured according to the requirement of the system of FIG. 3-6. For example, controller 532 can analyze image data captured from image sensor 522T in order to determine whether pixels of the bit map exhibit intensities in accordance with the reflectance characteristics of colors of a game tickets outer layer 238' and/or icon layer 226'. Furthermore if reader 510 and ticket 202 are made in accordance with a reflectance controlled material detection system wherein contrast is evident between a pattern and background of outer layer 238' and icon layer 226' then controller 532 may analyze patterns of either or both outer layer 238' and icon layer 226' to determine if the patterns satisfy predetermined criteria indicative of authenticity. If controller 532 at block 626 determines that the game ticket is authentic, or if a "Test for Scratch-off Material" flag is not raised, then controller 532 proceeds to decision stage 578 to determine whether a flag is raised for causing execution of a "Manual Validation" subroutine. The designers of some games may wish to require that validation of their game be performed by manual inspection only. A game designer, who wishes to require that validation be carried out by manual inspection only, may provide a lookup table as shown in FIG. 5-5 that includes a flag status indicator column including an indicator causing execution of the "Manual Validation" subroutine when controller 532 executes decision stage 578. In a "Manual Validation" subroutine, controller 532 at block 628 causes a display of a "Ticket Authentic, OK to Manually Validate" message then proceeds to block 630 to eject the ticket.

At block 579 controller 532 determines the status of flag controlling executing a "Test for Scratch-off material removal" subroutine. If this subroutine is caused to be executed, controller 532 analyzes image data captured from material detection image sensor 522M in order to determine if the game ticket has been played. If a ticket is presented to reader 510 without the scratch-off material being removed, it is normally indicative of an attempted fraud perpetrated by a ticket agent who wishes to separate winning tickets from losing tickets. A flow diagram illustrating a possible implementation of a "Scratch-Off Material Detection Removal" subroutine is described with reference to FIG. 6-2. In the case the reader is a reader such as 510' or 510" including an image sensor 522M' adapted to detect for the presence of a light sensitive additive in a game ticket, then controller 532 in a "Scratch-Off Material Removal Detection" subroutine and in a "Tamper Detection" subroutine to be described later herein may analyze image data captured from image sensor 522M'. Where a reader, e.g, 510, 510', 510" includes a controlled reflectance material detection system described with reference to FIG. 3-6, then controller 532 may analyze discernable contrast image data captured from topside image sensor 522T when executing a "Scratch-Off Material Removal Detection" subroutine or a "Tamper Detection" subroutine.

In a "Scratch-off Material Removal Detection" subroutine, controller 532 at block 634 determines from an appropriate bit map a reference point in the image data that corresponds to a particular point in a game ticket. The reference point may be provided, for example, by a point in the identification code bar code of a game ticket. All points in the image data corresponding to points in a game ticket can be found by reference to the identification code bar code symbol or another predetermined mark or indicia on game ticket 202. A reference point in the image data can also be determined by searching for, and locating in the image data a point which corresponds, e.g., to a corner point of the game ticket.

At block 635, controller 532 reads from lookup table 590 physical characteristic game data. Physical characteristic game data defines the region in the captured material detection bit map corresponding to the play area of the ticket with reference to a reference point in the bit map, such as any pixel value corresponding to a point on a bar code symbol, or a bit corresponding to a corner point of the game ticket.

When the physical characteristic game data is read at block 636, controller 532 determines the region in the captured image data corresponding to the ticket's play area, and then proceeds to block 637 to analyze the image data of the bit map in the location of the play area. At block 637, controller 532 determines whether the captured image data in the region of the play area indicates that the ticket has been played. A number of possible algorithms may be employed to make the determination of whether the ticket has been played.

In one method for making a determination as to whether a ticket has been played, controller 532 at block 637 evaluates the pixel values in the area of the bit map corresponding to a play area to determine the percentage of bits in the play area of the bit map having "light values". A "light value" pixel herein shall refer to a grey scale pixel value above a certain value or the bit value of P=1, in the case the pixels in the bit map are either captured as binary values or converted to binary values with use of a thresholding procedure. As indicated by the video image of FIG. 3-3 and in FIGS. 3-8 and 3-9, a high contrast will be apparent in the selected play area profile bit map between pixel values corresponding to locations in the play area that are scratched off and those pixel values corresponding to locations in the play area that are not scratched off. At block 637, controller 532 may determine that a ticket has been played if the pixel values corresponding to the play area indicate that more than a predetermined percentage of the scratch-off material has been removed. In one specific embodiment, controller 532 determines that a ticket has been played if the pixel values in the material detection bit map indicate that more than about 20 percent of the scratch-off material is removed.

If controller 532 at block 637 determines that less than a predetermined percentage of scratch-off material has been removed from a play area then controller at block 638 may cause a "Ticket Has Not Been Played" message to be displayed and then proceed to block 615 to reject the ticket.

At block 580, if the ticket has not been rejected controller 532 executes another decision stage to determine whether controller 532 will execute a "Tamper Detection" subroutine. In a "Tamper Detection" subroutine, controller 532 determines whether a ticket has been tampered with by a player or agent. In a tamper detection subroutine, controller 532 may determine whether small portions of the scratch-off material have been removed by a ticket agent or probability game player with the intention of determining variable indicia of the game ticket while maintaining the appearance that the ticket has not been played. In a sophisticated "Tamper Detection" subroutine, controller 532 may attempt to determine whether a portion of the scratch-off material has been lifted, then placed back on the ticket, or replaced with counterfeit scratch-off material.

In one embodiment, as described with reference to the flow diagram of FIG. 6-3, the method by which controller 532 determines whether a ticket has been tampered with is similar to the method by which controller determines if a ticket has been played. At block 640 controller 532 determines a reference point on the game ticket, at block 641 controller 532 reads physical characteristic data from lookup table 590 corresponding to the present ticket identification code, at block 642 controller 532 locates the image data from the bit map corresponding to the play area based on the physical characteristic game data, and at block 643 controller 532 analyzes the image data of the play area to determine whether the ticket has been tampered with. Of course, the location of image data of the material detection bit map which corresponds to the play area does not have to be re-determined at blocks 640–642 if the location as is the case with image data has previously been determined at blocks 634–636.

As is the case with the scratch-off material removal detection routine described with reference to FIG. 6-3, controller 532 at decision block 643 makes a determination as to whether a ticket has been tampered with based on the percentage of pixel values in the material detection bit map having light values. If the percentage is above a first predetermined value but below a second predetermined value, then the condition that the ticket has been pin pricked or otherwise tampered with is deemed to have been indicated. In one illustrative example of the invention, the condition that the game ticket has been tampered with is indicated in the bit map representation of the play area, then between about 0.5 percent and about 5 percent of the bit map pixel values have lighter values. If the determination is made at block 643 that the ticket has been tampered with then controller causes a "Tampered Ticket" message to be displayed at block 644 then rejects the ticket at block 615.

It will be seen that where controller 532 is configured in such a way that it may carry out both the scratch-off material removal detection routine described in connection with the flow diagram of FIG. 6-2 and the tamper detection removal subroutine of FIG. 6-3, then the subroutine for determining whether a ticket has been played should be modified so that the ticket can be subjected to a tamper detection subroutine without being rejected at block 637 on the basis of less then the threshold percentage of play area bit map pixel values having light values. To the end that the ticket will not be rejected at block 637 despite less than the threshold percentage of bit values in the play area of the bit map having light values, then controller can be caused to execute an additional decision at block 646 as indicated in the alternative flow diagram of FIG. 6-4 after executing block 637 in which controller 532 determines whether less than a trace amount (for example, 0.5 percent) of the scratch-off material has been removed. In this embodiment, controller 532 will determine that the ticket has not been played only if the bit map information reveals that none or essentially none of the scratch-off material has been removed, and will cause "Not Played" message to be displayed at block 638 and will reject ticket at block 615 only if a trace-amount percentage or less (such as 0.5 percent) of the play area bit map pixel values have light values. Furthermore if the tamper detection routine will determine whether tampering has taken place based on the percentage of play area bit map bit values having light values, then controller 532 can be made to skip execution of decision stage 580 if controller determines at block 637 that a ticket played indicating percentage of play area values have light values.

The illustrative indicating percentages provided thus far have been given for the case that the game ticket 202 presented to reader 510 includes a play area comprising a uniformly applied layer of scratch-off material. It will be understood that the selection indicating percentages which indicate the various conditions, e.g., that the ticket has been played, has not been played, or has been tampered with, will vary depending on the percentage of play area that is originally covered by a detectable scratch-off material when the ticket is manufactured.

In addition to or in place of the percentage light bit value tamper detection subroutine, controller 532 can be configured to carry out alternative methods for determining whether a game ticket has been tampered. Many such tamper detection methods are based on character recognition techniques as will be described herein.

In an alternative tamper detection subroutine, controller 532 analyzes pixel values of a play area profile bit map to determine if patterns are present in the play area image data indicative of an attempted tampering scheme. FIGS. 3-10 and 3-11 show video images corresponding to tampered game tickets. The image data corresponding to the video images of FIGS. 3-10 and 3-11 were captured using a controlled-reflectance scratch-off material detection scheme configured according to the system of FIG. 3-6. FIGS. 3-10 and 3-11 are video images of game tickets that have been subjected to pin pricking.

A pattern indicative of a pin prick can be detected by searching for a small number, 1 to N, of contiguous pixels corresponding to points of an icon layer surrounded by scratch-off material pixels. The small number contiguous pixel which can be considered to constitute a pin prick will vary depending on the resolution of the imaging system.

In a lifting tampering scheme, a subtle jagged line, arc or circle is normally formed in a play area. A well known line searching algorithm, such as a wall hugging scheme or a Hough transform accordingly can be employed to search in captured image data for a pattern indicative of a lifting tampering scheme.

A play area of a game ticket can be especially adapted to simplify the task of a tamper detection. As mentioned in Section II herein, scratch-off material can be formed in predetermined fragmented pattern so that a taper attempt is indicated by a mismatch or discontinuity in the predetermined pattern.

In another adaptation for simplifying tamper detection in a system comprising an additive based material detection scheme or a controlled reflectance detection scheme a predetermined pattern may be formed in outer layer 238 or 238' which can be recognized by the particular imaging system which will be employed. The predetermined pattern which preferably comprised contiguous lines may be formed in area over a play area that is slightly larger than a play area. The predetermined pattern enables a lifting scheme or pin prick scheme to be detected by detecting a discontinuity in the predetermined pattern. If a game ticket manufactured according to a controlled reflectance material detection scheme is to be made so that there is a detectable contrast between a background, a pattern, and a tamper detection pattern of an outer layer, then the background, pattern, and tamper detection pattern of the outer layer can be manufactured to have first, second, and third reflectance characteristic respectively.

With reference again to the main program shown in FIG. 5-4, controller 532 executes decision block stage 581 after executing "Tamper Detection" subroutine or after determining at block 580 that a flag has not been raised. At decision stage 581, controller 532 polls a flag whose status determines whether controller 532 will validate the game ticket by application of a validation routine that is resident in memory space. The status of this flag may be determined by either a flag status indicator that is stored in lookup table 590 or by an indicator in a predetermined address of memory space that is from time to time written to by host processor 558, or both.

In general, lottery game tickets are validated by applying the game ticket identification code of a ticket to a validating algorithm which determines whether the ticket is winner. By design, the features of a validating algorithm are kept secret so that a ticket agent cannot determine the win/loss status of a game ticket by determining an identification code for a game ticket. With reference to network hierarchy diagram of FIG. 5-3, a main security validating algorithm may be stored in a memory space 559 of remote host processor system 558, where it is maintained and updated (to encompass the identification codes of new tickets, or to surmount security breaches, for example), and may be periodically downloaded to local host processor 558, which periodically downloads the validating algorithm to reader 510.

In subroutine 575-5, controller 532 reads the ticket identification code from the memory address of memory space 548 where it has been previously stored and jumps to the EROM address at which the most recent validating algorithm has been written to, executes the algorithm and reads the result. If according to the algorithm the ticket is not a winner, then controller 532 proceeds to decision stage 582. Eventually, controller 532 at block 650 will cause display of a "Ticket Not a Winner" message if according to the algorithm the ticket is not valid. If according to the validation algorithm the ticket is a winner then controller 532 also jumps to decision stage 583 and eventually will cause a "Ticket is a Winner" message to be displayed at block 650 (FIG. 6-5).

At block 582 controller 532 polls the status of an "External Validation" subroutine flag for determining whether controller 532 will validate the present ticket using a validating algorithm stored in a memory space external to reader 510. This decision stage will normally be executed only if the "Internal Validation" subroutine flag polled at block 581 is lowered. Like the internal validation flag, the status of the external validation flag can be raised or lowered either by an indicator of a lookup table 590 or by an indicator in a memory space address of reader 510 which is written to periodically by local host processor system 558. A game designer may provide an external validation flag status indicator in lookup table 590 if the designer wishes that tickets of that style be validated externally each time they are read. Local host processor system 558 may write an external validation algorithm flag status indicator to memory space 548 of reader 510 in the case that, for example, because of a security problem, or because of a change in the validation algorithm, it is desired to validate the game ticket externally.

When an external validation flag is raised, then controller 532 may read the ticket identification code, upload the identification code to local host processor system 558, where it is applied to a validating algorithm, then receive an indicator from local host processor system 558 as to the win/loss status of the game ticket. Controller 532 at block 650 will cause to be displayed the appropriate "Ticket is a Winner" or "Ticket is not a Winner" depending upon the win/loss status of the game ticket as determined by the validating algorithm.

If reader 510 is equipped in accordance of a controlled reflectance material detection system described with reference to FIG. 3-6, and if reader 510 and ticket 202 are made so that contrast is evident between a pattern and background of icon layer 226' then controller 532 may execute an additional check on the validity of a ticket by determining whether exposed patterns an icon layer in one or several play areas are in accordance with a criteria indicative of a winning ticket.

At block 583, controller 532 polls the status of a "Branding" subroutine flag for controlling whether controller will execute a branding subroutine. In a "Branding" subroutine reader 510 subjects a game ticket to an energy source so that brandable ink formed on the game ticket becomes visible. In executing decision stage 583 controller 532 normally reads a flag status indicator of lookup table 590 in order to determine the status of a branding subroutine flag.

An example of a "Branding" subroutine according to the invention is described with reference to the flow diagram of FIG. 6-5. At block 655, controller 532 issues the appropriate command to cause brander 520 to energize and brand ticket 202. The timing of the issuance of this command should be selected so that substantially all of a surface of the ticket is exposed to the energy emanating from brander 520. Preferably, transport mechanism 514 holds ticket 202 in a stationary position when a ticket is branded.

After ticket 202 is branded at block 655, controller 532 can be made to check if the branding was successful. A determination that the branding was not successful will indicate that the ticket did not include brandable ink and that therefore the ticket is not authentic.

In order to determine whether the branding was successful, controller 532 at block 656 may issue a command to transport motor PCB board 546 to cause transport of ticket 202 in a reverse direction. While ticket 202 is transported in a reverse direction, controller 532 is made to capture image data representing image signals generated by bottomside image sensor 522B in the manner described previously so that controller 532 captures at block 657 a second bit map representation of indicia formed on the bottomside of the game ticket.

At block 658, controller 532 locates the identification code represented in the second bit map, then at block 659, analyzes the image data in the bar code symbol portion of the bit map to determine, based on characteristics of that image data, whether the ticket has been branded. The determination of whether a ticket has been branded can be made at block 659 by attempting to decode a located bar code symbol if the ticket is of a type having brandable material formed thereon according to such a pattern that an identification code symbol is obscured when the material is branded. If the symbol which was successfully decoded at block 617 cannot be decoded at block 659, there is an indication that the ticket has been successfully branded. If at block 659, controller 532 determines that the branding was not successful then controller 532 may cause a "Ticket not Authentic" or "Counterfeit Ticket" message to be displayed on display screen at block 660. Controller 532 may also be made to search for a brand pattern in accordance with a method described in connection with block 618 or 618' in order to determine whether the ticket branding was successful.

In the case the branding was successful, controller 532 at block 650 causes the appropriate ticket win/loss status to be displayed before ejecting the ticket at block 662.

While this invention has been described in detail with reference to a preferred embodiment, it should be appreciated that the present invention is not limited to that precise embodiment. Rather, in view of the present disclosure which describes the best mode for practicing the invention, many modifications and variations would present themselves to those skilled in the art without departing from the scope and spirit of this invention, as defined in the following claims.

What is claimed:

1. A voidable document comprising:

a substrate;

a conductive material supported on said substrate according to a predetermined pattern defining a relatively higher resistance section of said conductive material; and brandable material supported on said substrate at a specific location of said substrate, wherein said relatively higher resistance section is formed at or about said specific location of said brandable material, so that, when voltage is applied across said conductive material, a relatively higher amount of heat in said conductive material is generated at or about said specific location of said brandable material.

2. The voidable document of claim 1, wherein said conductive material is printable conductive material.

3. The voidable document of claim 1, wherein said brandable material is printable thermochromatic ink.

4. The voidable document of claim 1, wherein said conductive material is defined by a plurality of conductive sections and wherein said relatively higher resistance conductive section includes a relatively smaller average cross-sectional area than said remaining conductive sections.

5. The voidable document of claim 1, further comprising a plurality of contact pads formed in electrical contact with said conductive material.

6. A method for branding a specific predetermined location of a document, said method comprising the steps of:

forming brandable material at said specific predetermined location of said document;

applying conductive material to said document according to a predetermined pattern so that a relatively higher resistance section of said conductive material is defined on said document at or about said specific predetermined location; and supplying a voltage across said conductive material so that said relatively higher resistance section emits heat about said predetermined area sufficient to effect an observable change in said brandable material.

7. The method of claim 6, wherein said applying step included the step of printing said conductive material on said document.

8. The method of claim 6, wherein said forming step includes the step of printing thermochromatic ink on said document.

9. The method of claim 6, wherein said applying step includes the step of forming a plurality of conductive sections on said document, wherein said relatively higher resistance section includes a smaller cross sectional area than said remaining conductive sections.

10. A document voiding system comprising:
   a document comprising brandable material formed at a specific predetermined location thereon, and conductive material applied thereon according to a predetermined pattern wherein a relatively higher resistance section of said conductive material is formed at or about said predetermined location;
   an apparatus for processing said document, said apparatus comprising a voltage source, wherein said apparatus is configured so that said voltage source supplies voltage to said conductive material when said document is received in said apparatus, said voltage being of such a level that heat generated about said predetermined area resulting from current flowing through said relatively higher resistance section of said conductive material is sufficient to cause an observable change in said brandable material.

11. The system of claim 10, wherein said conductive material formed on said document comprises conductive ink.

12. The system of claim 10, wherein said brandable material formed on said document comprises printable thermochromatic ink.

13. The system of claim 10, wherein said apparatus includes a feed path, and wherein said apparatus is adapted to supply voltage to said document when said document is manually inserted into said feed path.

14. The document of claim 1, wherein said brandable material is formed on said document in a specific brand pattern.

15. The method of claim 6, wherein said brandable material is formed on said document in a specific brand pattern.

16. The system of claim 10, wherein said brandable material is formed on said document in a specific brand pattern.

* * * * *